(12) United States Patent
Nakanishi et al.

(10) Patent No.: US 7,444,460 B2
(45) Date of Patent: Oct. 28, 2008

(54) DATA STORAGE DEVICE, METHOD FOR UPDATING MANAGEMENT INFORMATION IN DATA STORAGE DEVICE, AND COMPUTER PROGRAM

(75) Inventors: Kenichi Nakanishi, Tokyo (JP); Junko Sasaki, Tokyo (JP); Nobuhiro Kaneko, Kanagawa (JP); Osamu Nagata, Aichi (JP); Hideaki Okubo, Saitama (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 10/514,985

(22) PCT Filed: Mar. 5, 2004

(86) PCT No.: PCT/JP2004/002924

§ 371 (c)(1),
(2), (4) Date: Nov. 18, 2004

(87) PCT Pub. No.: WO2004/084074

PCT Pub. Date: Sep. 30, 2004

(65) Prior Publication Data

US 2005/0182892 A1  Aug. 18, 2005

(30) Foreign Application Priority Data

Mar. 19, 2003  (JP)  ............................. 2003-074931

(51) Int. Cl.
  *G06F 12/12* (2006.01)
(52) U.S. Cl. ...................... 711/103; 711/155; 711/157; 711/203
(58) Field of Classification Search ........................ None
See application file for complete search history.

(56) References Cited

U.S. PATENT DOCUMENTS

| | | | |
|---|---|---|---|
| 6,330,028 B1 | 12/2001 | Oie et al. | |
| 6,385,690 B1 * | 5/2002 | Iida et al. | 711/103 |
| 6,477,616 B1 * | 11/2002 | Takahashi | 711/111 |
| 7,092,911 B2 * | 8/2006 | Yokota et al. | 705/57 |

(Continued)

FOREIGN PATENT DOCUMENTS

| | | |
|---|---|---|
| JP | 10-207788 | 8/1998 |
| JP | 11-144478 | 5/1999 |
| WO | WO 02/054247 | 7/2002 |

*Primary Examiner*—Than Nguyen
(74) *Attorney, Agent, or Firm*—Frommer Lawrence & Haug LLP; William S. Frommer; Thomas F. Presson

(57) ABSTRACT

The invention provides a data storage device and a method of updating management information, capable of dealing with management information in a highly reliable manner so that information is not easily lost when an error occurs. File management information such as a FAT serving as address management information in a flash memory is stored in a management information area of the memory, a pair of blocks is assigned as blocks for use to store data of the FAT, and writing of updated FAT information is performed by alternately using the two blocks of the block pair such that previous FAT information is retained in one of the two blocks of the block pair, and updated FAT information is written in the other block of the block pair, whereby, even when an error occurs in the middle of the process of writing the updated management information, a process using the retained previous FAT information is possible.

14 Claims, 21 Drawing Sheets

U.S. PATENT DOCUMENTS

| | | |
|---|---|---|
| 2001/0049764 A1 | 12/2001 | Lu et al. |
| 2002/0069313 A1 | 6/2002 | Douniwa et al. |
| 2003/0014582 A1* | 1/2003 | Nakanishi .................. 711/103 |
| 2005/0180729 A1* | 8/2005 | Kihara et al. .................. 386/46 |
| 2006/0029230 A1* | 2/2006 | Kihara et al. ............... 380/269 |
| 2006/0095381 A1* | 5/2006 | Yokota et al. .................. 705/57 |

* cited by examiner

| TYPE OF MANAGEMENT INFORMATION | DATA STRUCTURE OF LOGICAL BLOCK MANAGEMENT INFORMATION | DESCRIPTION OF LOGICAL BLOCK MANAGEMENT INFORMATION |
|---|---|---|
| LOGICAL-PHYSICAL ADDRESS CONVERSION TABLE BLOCK | BLOCK TYPE / BLOCK NUMBER / REVISION | ○ BLOCK NUMBER SPECIFIES SEGMENT OF LOGICAL TABLE<br>○ REVISION INDICATES VERSION NUMBER WHICH IS INCREMENTED BY 1 EACH TIME UPDATED |
| FILE ALLOCATION TABLE (FAT) BLOCK | BLOCK TYPE / BLOCK NUMBER / REVISION | ○ THERE ARE TWO FAT'S, FAT 1 AND FAT 2, IN LOGICAL FORMAT<br>○ BLOCK NUMBER INDICATES CORRESPONDING SECTOR ADDRESS IN LOGICAL FORMAT<br>○ REVISION INDICATES VERSION NUMBER WHICH IS INCREMENTED BY 1 EACH TIME UPDATED |
| ALTERNATIVE BLOCK | BLOCK TYPE / BLOCK NUMBER / REVISION | ○ CLEARED BLOCK WITH ALL BITS = 1 |

FIG. 9

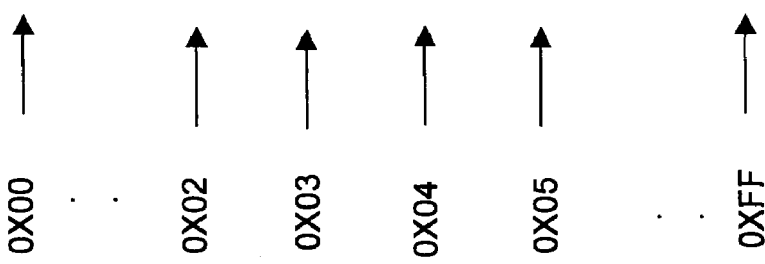
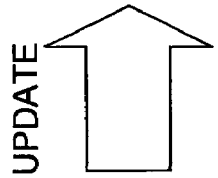
FIG. 12

DATA STORAGE DEVICE, METHOD FOR UPDATING MANAGEMENT INFORMATION IN DATA STORAGE DEVICE, AND COMPUTER PROGRAM

TECHNICAL FIELD

The present invention relates to a data storage device, a method of updating management information in a data storage device, and a computer program. More specifically, the present invention relates to a method and apparatus for writing management information such as a logical-physical address conversion table and/or file management information (for example, a FAT (File Allocation Table)) into a flash memory. In particular, the present invention relates to a data storage device, a method of updating management information in a data storage device, and a computer program, capable of dealing with management information in a highly reliable manner so that information is not easily lost when an error occurs.

BACKGROUND ART

A flash memory is widely used as a data storage device in various types of electronic devices such as a PC (Personal Computer), a data recorder/player, a PDA, and a video camera. The flash memory is easy to write or delete data and has advantages of small size, low weight, high speed, and low power consumption. Because of the above advantages, the flash memory is widely used as a storage medium for storing, for example, image data, audio data, a text file, and/or a program.

In particular, a memory card using a flash memory capable of being removably attached to an electronic device is very widely used. For example, this type of memory card is used such that after video data taken by a video camera is stored into the memory card, the memory card is inserted into a PC and the video data is played back on the PC or such that after music data is downloaded via the Internet or from a storage medium such as a CD, DVD, or MD into a memory card inserted in the PC, and the memory card is inserted in a portable player and the downloaded music data is played black.

As shown in FIG. 1, blocks 110 and pages 120 are defined in the flash memory, wherein deletion of data is performed in units of blocks and reading/writing of data is performed in units of pages. The flash memory includes a plurality of blocks, and each block includes a plurality of pages. Each page includes, for example, a 512-byte data storage area 121 and a 16-byte extension area 122 in which parity data or the like is written. The data sizes of the data storage area and the extension area are set arbitrarily depending on the flash memory. For example, the data size of the data storage area 121 is set to 2048 bytes and the data size of the extension area 122 is set to 64 bytes.

Writing, reading, or deleting of data in the flash memory is performed on a particular data area in the flash memory specified by an address. To specify an address in the flash memory, it is necessary to convert a logical address indicated by addressing information received from an electronic device using the flash memory into a physical address indicating a physical location in the flash memory.

In the flash memory, a logical-physical address conversion table, in which information necessary to convert a logical address to a physical address is described, is stored in a management information area allocated in a particular block in the flash memory.

A specific example of an application of a logical-physical conversion table to a flash memory may be found, for example, in Patent Document 1 (Japanese Unexamined Patent Application Publication No. 2000-47932).

In the flash memory, for example, when data stored in a certain page is read by an electronic device such as a PC and data is updated, the updated data is written at a location different from a page in which the read data was located. This is because the flash memory has an upper limit in terms of the number or times data is written or deleted for the same memory element, and thus it is desirable to use various memory elements instead of using only particular memory elements thereby increasing the overall life of the flash memory.

By performing the address conversion based on the logical-physical address conversion table, it becomes possible to preserve the logical address at the same value even if the physical storage location is changed when data is updated. This allows the electronic device to use the same logical address in reading/writing updated data as the logical address assigned to the data before the data was updated.

It is known in the art to use a FAT (File Allocation Table) as a file management system in a PC or a similar device. The FAT is widely used as management information to indicate file storage locations in various types of storage devices such as a hard disk or a floppy disk. In the FAT, when data is stored in units of clusters, a concatenation from one cluster to another of a set of clusters in which a data file is stored is described in the form of a table. That is, information indicating the cluster-to-cluster concatenation is described in the FAT. The FAT is also used as file management information in the flash memory.

In the flash memory, each block corresponds to one cluster that is defined in the FAT as a unit of a data storage area. That is, when a single data file is stored in a plurality of blocks (corresponding to clusters) of the flash memory, information indicating block-to-block concatenation of those blocks is described in the FAT.

The logical-physical address conversion table and the FAT are stored in particular blocks of the flash memory. When a host device such as a PC or a similar electronic device uses the flash memory, the host device reads the logical-physical address conversion table and the FAT into a RAM (Random Access Memory) disposed in the host device. When data such as music data or image data stored in the flash memory is updated, the logical-physical address conversion table and the FAT stored in the RAM of the host device are also updated under the control of the CPU of the host device. The updated management information is rewritten in the management information area of the flash memory.

In the host device such as a PC on which the memory card using the flash memory is mounted, a process of writing or reading data into or from the memory card is performed as follows. In response to a request from an application program, a file storage location is detected from the FAT. That is, logical addresses of blocks in which the file is stored are acquired from the information indicating the block-to-block concatenation corresponding to cluster-to-cluster concatenation described in the FAT. Furthermore, a logical-to-physical address conversion is performed according to the logical-physical address conversion table, and accessing to physical addresses determined via the logical-to-physical address conversion is performed.

In the flash memory, as described above, writing, reading, and deleting of data are performed in accordance with the FAT and the logical-physical address conversion table. The management information including the FAT and the logical-physical address conversion table is stored in a block of the flash memory.

As described above, when data stored in the flash memory is updated, it is necessary to also update the management information. Referring to a flow chart shown in FIG. 2, a process of updating management information stored in the flash memory is described below. Herein, we assume that management information is stored in a particular block of the flash memory.

First, in step S21, a CPU serving as data write/read/delete means examines the particular block in the flash memory to determine whether the block includes an available page. If an available page is detected in the block, the process proceeds to step S22, but otherwise the process jumps to step S23.

In step S22, the CPU allocates an available page, in the same block as that in which current management information to be updated is stored, for use as a page in which to write updated management information.

On the other hand, in the case in which the process jumps to step S23 because the page in which the management information is stored is the last page of the block, the CPU allocates an available block in the flash memory and further allocates the first page of that block as a new page for use to write updated management information.

In step S24 or S25, the CPU writes updated management information in the new page allocated in step S22 or step S23. In step S26, after completion of writing the updated management information in step S25, all blocks in which the old management information is stored are deleted thereby making those blocks available. Thus, the update process is completed.

In the process described above with reference to the flow chart shown in FIG. 2, the management information stored in blocks of the flash memory are updated as described below with reference to FIG. 3.

Herein we assume that the management information is written into blocks 151 and 152. The writing of the management information in the block 151 is performed starting from page number 0 of the block 151 until reaching page number n. Thereafter, in the block 152, the remaining part of the management information is further written starting from block number 0. As described above, the management information is updated from one block to another.

In the above process, if the updating of the management information stored in the flash memory fails, or if an error occurs in the updating process and new management information is not successfully written, the CPU treats the current management information as newest management information.

In the flash memory, if an error occurs in the process of writing data in a page, an error can affect all data in a block to which the page belongs. This is known as a domino error.

In a domino error, as shown in FIG. 4, if an error occurs at a certain bit in a page of a block, an error also occurs at the same bit in all pages of that block, and thus all data in the block is damaged.

In the process of updating management information stored in the flash memory, as described above with reference to the flow chart shown in FIG. 2, new management information is written in an available page next to a page of a block in which the current management information is written. Therefore, if an error occurs in the updating process, this error causes an error in all management information stored in the same block as the block including the page in which the original error occurred. As a result, the current management information, which must be retained for use as management information that will be used when updating fails, also has an error and the management information is lost. Thus, it becomes impossible not only to continue the updating process but also to read data.

In conventional flash memories, only one bit is stored in each memory cell. If a plurality of bits, such as two bits or four bits, are stored in each memory, the total storage capacity of the flash memory can be increased, and the cost can be reduced. However, in this case, a domino error will affect a greater number of bits, and it will not be able to deal with the error simply by applying an error correction code.

DISCLOSURE OF INVENTION

In view of the above-described problems with the conventional technique, it is an object of the present invention to provide a data storage device, a method of updating management information in a data storage device, and a computer program, capable of protecting management information from being damaged when a writing error occurs in updating of the management information.

It is another object of the present invention to provide a data storage device, a method of updating management information in a data storage device, and a computer program, characterized in that writing of updated data of file management information such as a FAT is performed by alternately using a plurality of blocks.

In an aspect, the present invention provides a data storage device including a data storage unit and a control unit for controlling inputting and outputting of data to or from the data storage unit, wherein:

the data storage unit is divided into blocks each including a plurality of pages each having a predetermined storage capacity, and the data storage unit includes a data area for storing user data and a management information area for storing management information including address information used to access the data area;

in the management information area, file management information including address concatenation information associated with a data file stored in the data area is stored; and the control unit executes a process of writing updated file management information such that previous file management information is retained in a page in one of two different blocks forming a block pair, and the updated file management information is written in a page in the other one of the two blocks of the block pair.

In a mode of this data storage device according to the present invention, the file management information is a FAT (File Allocation Table), and in the process of writing updated file management information, the control unit writes updated FAT information by alternately using a page in one of the two blocks of the block pair and a page in the other one of the two blocks of the block pair.

In a mode of this data storage device according to the present invention, two physical addresses of the block pair are set as address information corresponding to one logical address assigned to the file management information, and the control unit acquires address information of two physical addresses corresponding to a logical address indicating file management information to be updated, and the control unit identifies two blocks indicated by the respective two physical addresses as the block pair to be used to write updated file management information.

In a mode of this data storage device according to the present invention, the control unit executes the process of writing updated file management information each time a unit of user data is written in the data area assigned as the storage area for storing user data.

In a mode of this data storage device according to the present invention, in the management information area of the data storage unit, a logical-physical address conversion table is further stored, which indicates the correspondence between a logical address assigned to data stored in the data area and a physical address indicating a physical location at which the data is stored in the data area.

In a mode of this data storage device according to the present invention, the control unit further executes a process of writing updated information of the logical-physical address conversion table such that previous information of the logical-physical address conversion table is retained in a page in one of two different blocks forming a block pair, and the updated information of the logical-physical address conversion table is written in a page in the other one of the two blocks of the block pair.

In a mode of this data storage device according to the present invention, the data storage device is adapted to be capable of removably connected with an information processing apparatus, and the data storage device further comprises interface means for inputting or outputting data to or from the information processing apparatus, and when the control unit receives a logical address from the information processing apparatus via the interface means, the control unit acquires two physical addresses corresponding to the received logical address and identifies two blocks indicated by the respective two physical addresses as the block pair to be used to write updated file management information.

In a mode of this data storage device according to the present invention, the control unit executes the process of updating file management information in units of pages, and the process of writing updated management information by alternately using a page in one of two blocks forming a block pair and a page in the other one of the two blocks forming the block pair, wherein in the process of writing updated management information, if a block of the block pair does not have an available page, the control unit deletes data stored in a block other than a block in which previous file management information is stored, and writes the updated management information in the first page of the deleted block.

According to a second aspect, the present invention provides a method of updating management information in a data storage device including a data storage unit and a control unit for controlling inputting and outputting of data to or from the data storage unit, the method comprising the steps of:

inputting a logical address corresponding to management information to be updated;

identifying a block pair by acquiring address information of two physical addresses corresponding to the logical address and identifying two blocks indicated by the respective two physical addresses as the block pair to be used to write updated file management information; and writing the updated management information such that previous file management information is retained in a page in one of two blocks of the block pair, and the updated file management information is written in a page in the other one of the two blocks of the block pair.

In a mode of the method of updating management information in a data storage device according to the present invention, the file management information is a FAT (File Allocation Table), in the process of writing updated management information, updated FAT information is written by alternately using a page of one of two blocks of the block pair and a page of the other block of the block pair.

In a mode of the method of updating management information in a data storage device according to the present invention, the step of writing updated file management information is executed each time a unit of user data is written in a data area assigned as an area for storing user data.

In a mode of the method of updating management information in a data storage device according to the present invention, the method further comprises the steps of: identifying a block pair by acquiring address information of two physical addresses corresponding to the logical address input in the logical address inputting step, and identifying two blocks indicated by the respective two physical addresses as the block pair to be used to write updated information of a logical-physical address conversion table; and writing the updated management information such that previous information of the logical-physical address conversion table is retained in a page in one of two blocks of the block pair, and the updated information of the logical-physical address conversion table is written in a page in the other one of the two blocks of the block pair.

In a mode of the method of updating management information in a data storage device according to the present invention, the step of writing updated management information includes the steps of updating file management information in units of pages, and writing updated management information by alternately using a page in one of two blocks forming a block pair and a page in the other one of the two blocks forming the block pair, wherein in the step of writing updated management information, if a block of the block pair does not have an available page, data stored in a block is deleted other than a block in which previous file management information is stored, and the updated management information is written in the first page of the deleted block.

In a third aspect, the present invention provides a computer program for executing a process of updating management information in a data storage device including a data storage unit and a control unit for controlling inputting and outputting of data to or from the data storage unit, the process comprising the steps of:

inputting a logical address corresponding to management information to be updated;

identifying a block pair by acquiring address information of two physical addresses corresponding to the logical address and identifying two blocks indicated by the respective two physical addresses as the block pair to be used to write updated file management information; and writing the updated management information such that previous file management information is retained in a page in one of two blocks of the block pair, and the updated file management information is written in a page in the other one of the two blocks of the block pair.

In the present invention, as described above, file management information such as a FAT serving as address management information in a flash memory is stored in a management information area of the memory, a pair of blocks is assigned as blocks for use to store data of the FAT, and writing of updated FAT information is performed by alternately using the two blocks of the block pair such that previous FAT information is retained in one of the two blocks of the block pair, and updated FAT information is written in the other block of the block pair, whereby, even when an error occurs in the middle of the process of writing the updated management information, the previous FAT information is preserved without being lost, and thus processing using the previous FAT information is possible. For example, accessing of data using the previous FAT information is possible. Furthermore, re-updating of the FAT information is also possible using the previous FAT information.

In the present invention, two different physical addresses are related to one logical address corresponding to a FAT, two blocks to be used to write updated data are immediately determined based on a given logical address, and a block and a page to be used to write the updated data depending on a block and a page in which the previous data is stored. Thus, it is possible to quickly determine the block and the page to be used to write the updated management information.

Furthermore, in the process of updating file management information such as a FAT according to the present invention, unlike the conventional process of rewriting data, it is not necessary to acquire a block which has already been deleted and copy page data from a block, where previous data is stored, into the already-deleted block, and thus it is possible to reduce the time needed to perform the management information update process. Even if a user removes the memory card from the host device immediately after updating user data, there is little possibility that an error due to incompletion of updating management information occurs, because updating of management information including the FAT and the logical-physical address conversion table is performed in a very short time.

The computer program according to the present invention may be provided to a general-purpose computer system capable of executing various computer program codes via a storage medium such as a CD, an FD, or an MO on which the program is stored in a computer-readable manner or via a communication medium such as a network. By providing the program in the computer-readable form as described above, it becomes possible to execute processes on the computer system in accordance with the program.

Further objects, features and advantages of the present invention will become apparent from the following description of the preferred embodiments with reference to the accompanying drawings.

BRIEF DESCRIPTION OF THE DRAWINGS

FIG. 9 is a diagram showing logical block management information indicating attribute information of information stored in a management information area of a flash memory according to the present invention.

FIG. 12 is a diagram showing a process of updating a logical-physical address conversion table of a flash memory.

BEST MODE FOR CARRYING OUT THE INVENTION

The data storage device, the method of updating management information in the data storage device, and the computer program according to the present invention are described in further detail below with reference to the accompanying drawings.

[Structure of Data Storage Device (Memory Card)]

Figure 1:
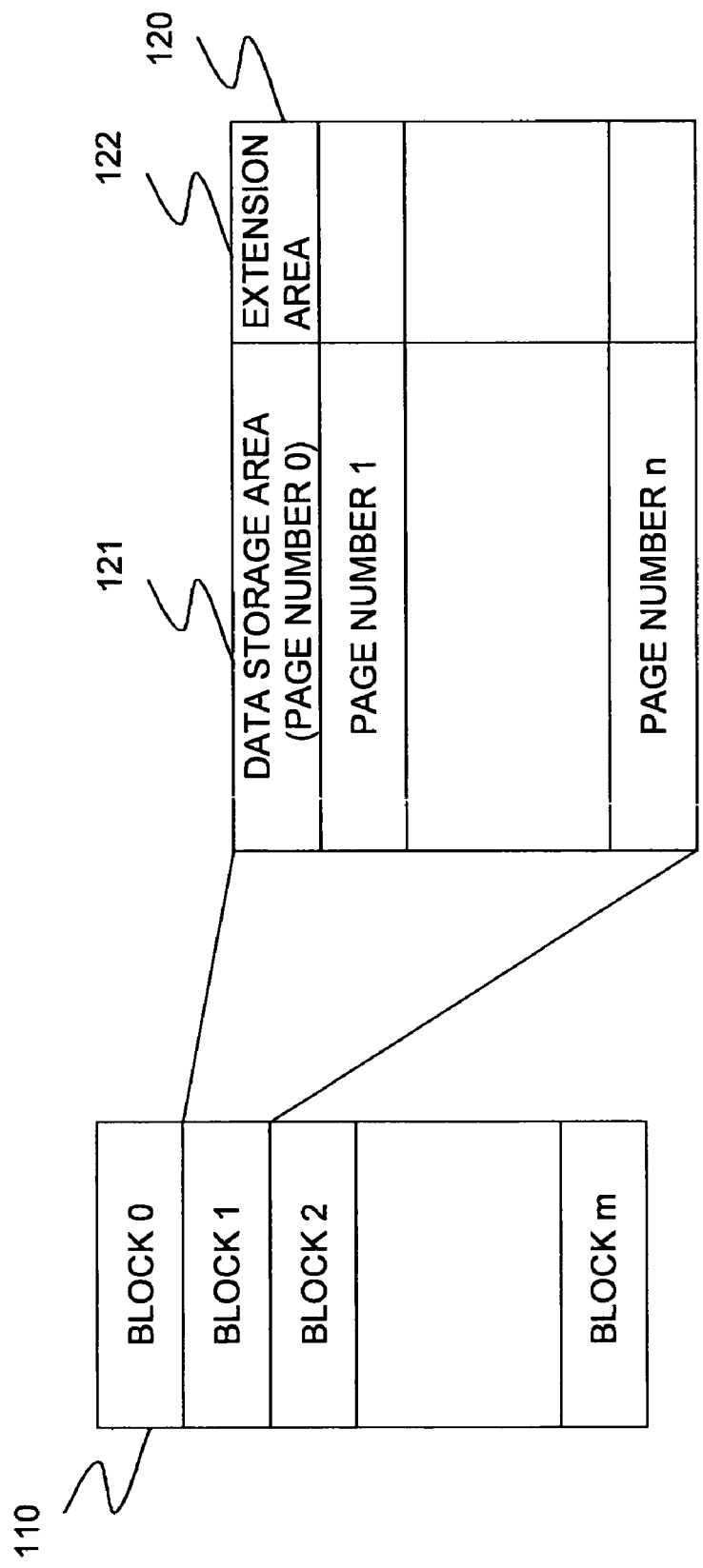
FIG. 1 is a diagram showing a configuration of a flash memory in terms of blocks and pages.
Figure 2:
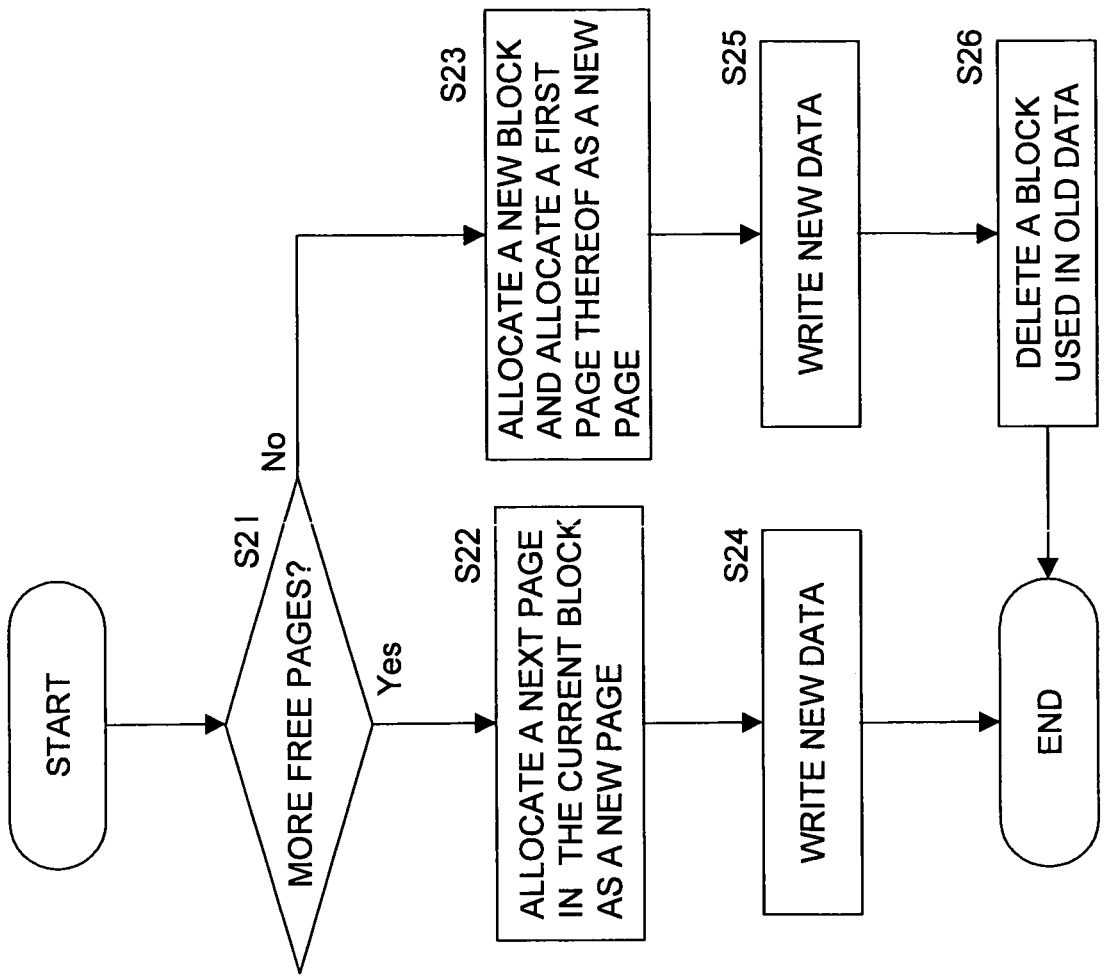
FIG. 2 is a flow chart showing a process of writing data into a flash memory.
Figure 3:
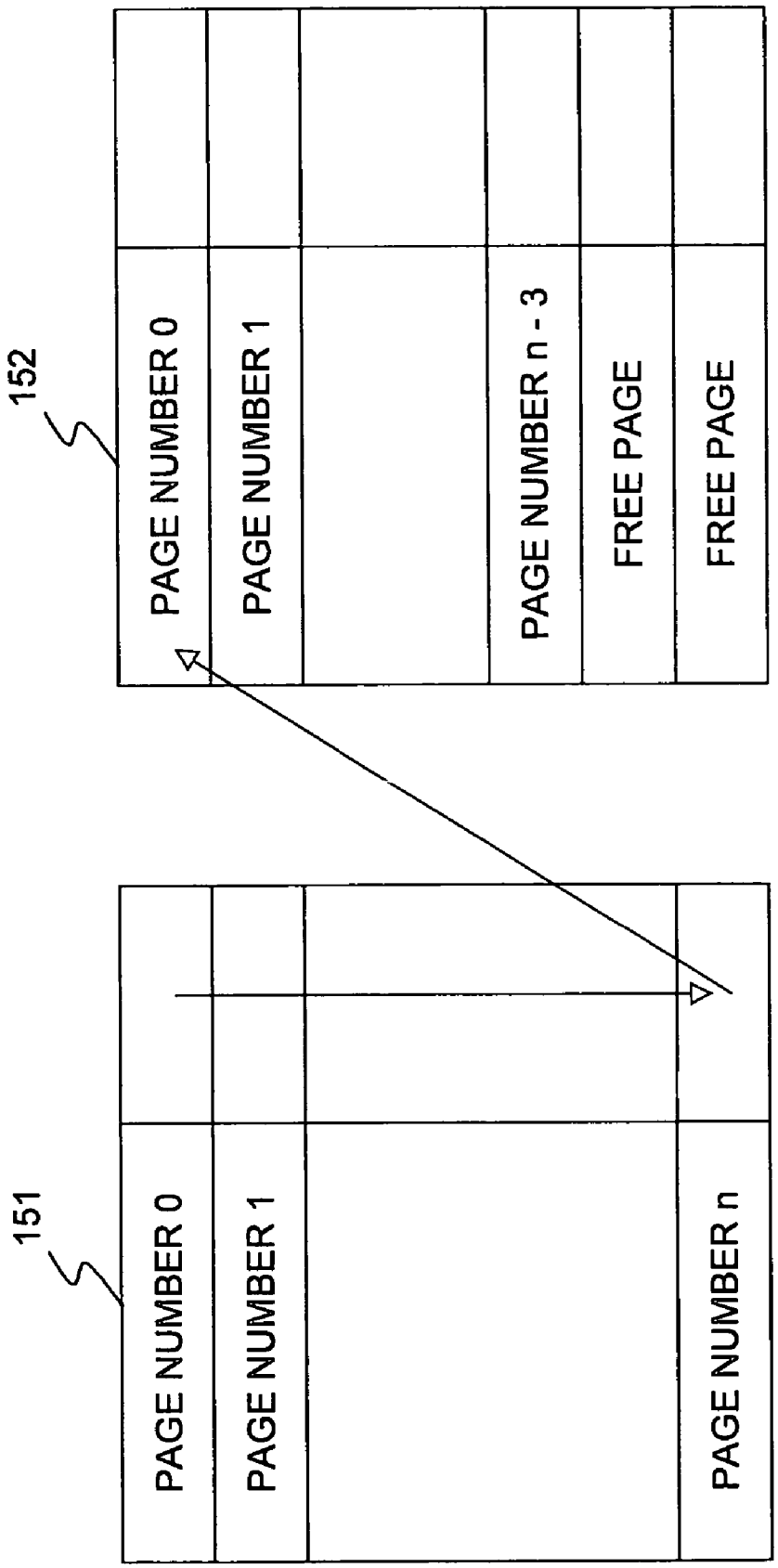
FIG. 3 is a diagram showing a configuration of a flash memory.
Figure 4:
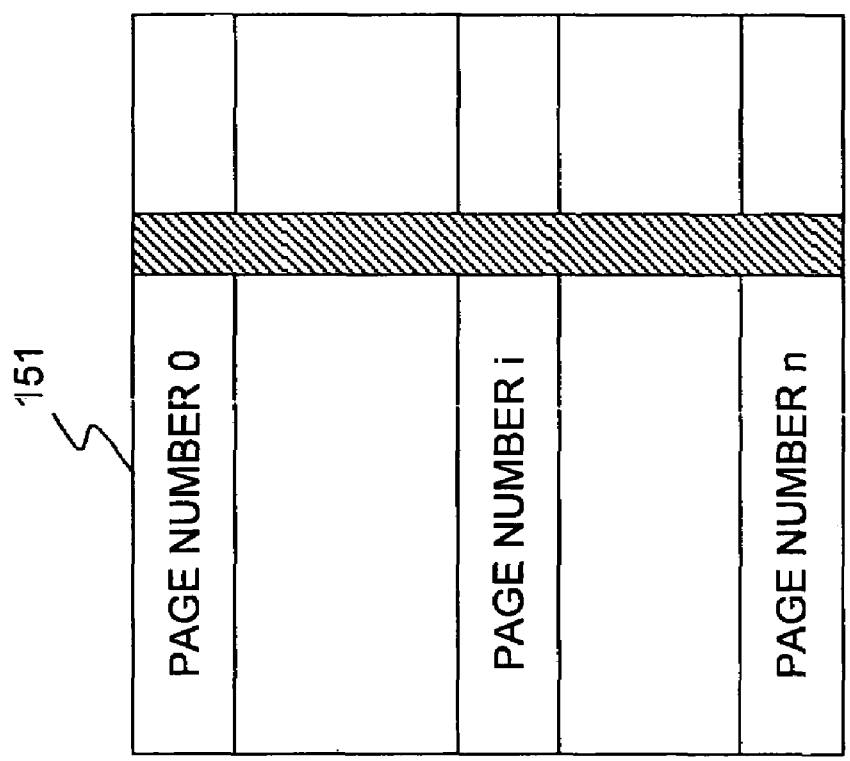
FIG. 4 is a flow chart showing a manner in which an error occurs in a flash memory.
Figure 5:
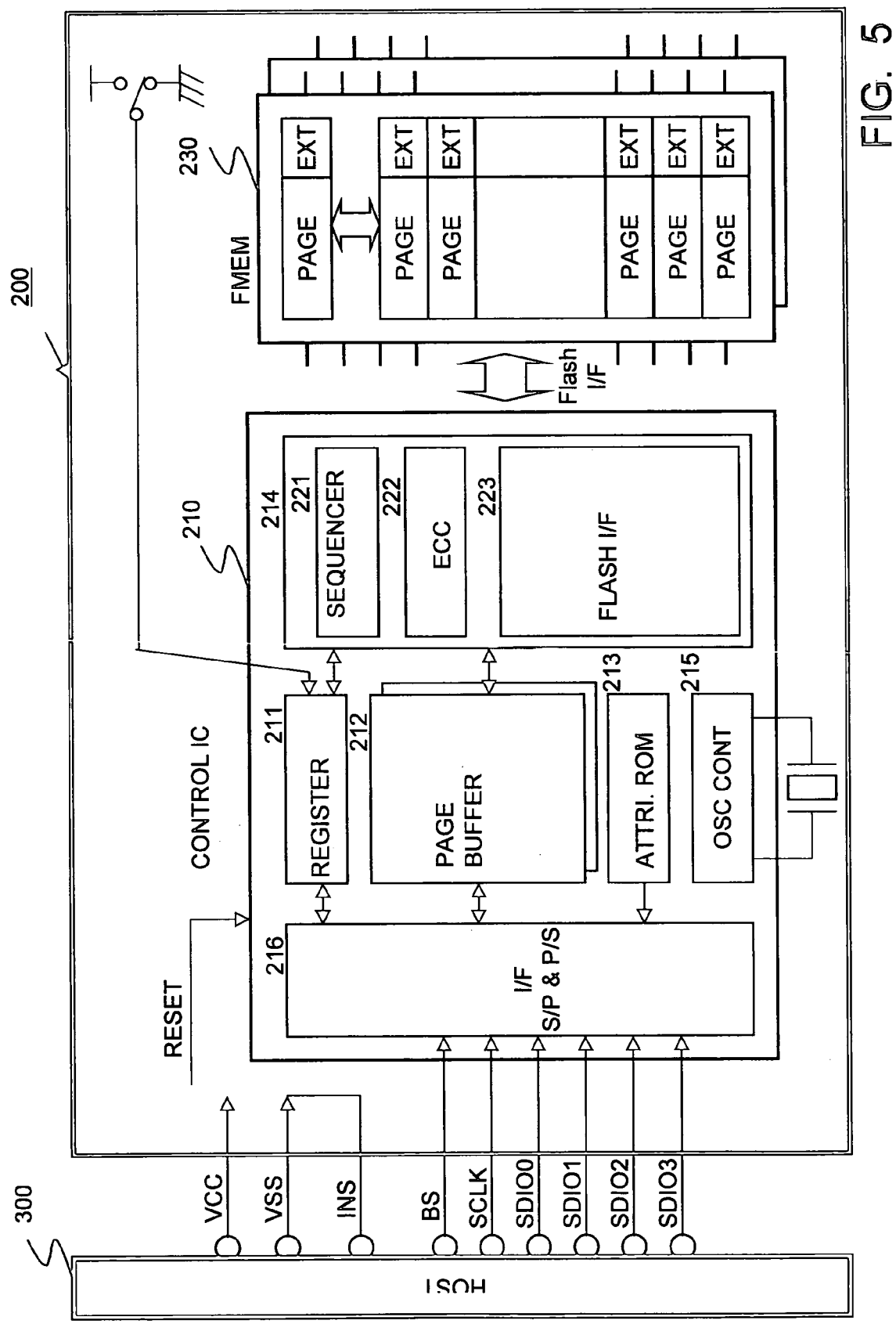
FIG. 5 is a block diagram showing a structure of a memory card according to the present invention.

Referring to FIG. 5, the structure of a data storage device including a flash memory and a control IC is described, taking a memory card as a specific example of the data storage device.

The data storage device 200 includes a flash memory (FMEM) 230 and a control IC 210. The data storage device is used in a state in which it is mounted on or inserted in a host device (HOST) 300 that may be of one of various types, such as a PC, a data recorder/player, and a video camera. Although the data storage device 200 may also be firmly mounted on a host device, the data storage device 200 is generally adapted to be capable of being removably mounted on various host devices.

The data storage device 200 includes a power supply terminal VCC and a VSS ground terminal VSS. When the data storage device 200 is mounted on the host device 300, electric power is supplied from the hose device 300 to the data storage device 200 via the power supply terminal VCC and the ground terminal VSS. A detection terminal (INS) is used by the host device 300 to detect whether the data storage device 200 is inserted. In the data storage device 200, the detection terminal (INS) is grounded. In the host device 300, the detection terminal (INS) is connected to the power supply via a pull-up resistor. Thus, when the data storage device 200 is mounted on the host device 300, the voltage of the detection terminal (INS) goes to a low level "L". However, the voltage of the detection terminal (INS) is at a high level "H" when no data storage device is mounted on the host device 300.

Blocks and pages are defined in the flash memory (FMEM) 230 such that deletion of data is performed in units of blocks and reading/writing of data is performed in units of pages. Each page includes, for example, a 512-byte data storage area and a 16-byte extension area in which parity data or the like is written. The detailed structure of the flash memory will be described later with reference to FIG. 6 and other figures. The data area and the extension area may be set to have various data storage capacities. For example, the data storage device 200 is typically configured so as to have a 2048-byte data area and a 64-byte extension area.

An interface 216 disposed in the control IC 210 controls a data transfer between the data storage device 200 and the host device 300 on which the data storage device 200 is mounted. When data is transferred, serial-parallel conversion is performed via the interface 216. More specifically, in the operation of writing data into the flash memory 230, when serial data is transmitted from the host device 300 via the bidirectional data signal lines (SDI00 to SDI03) in synchronization with a transfer clock signal (SCLK), the received serial data is converted into parallel data with a with of a plurality of bits (for example, 8 bits or 16 bits). Regardless of whether the received serial data is a control command or general data, the received data is converted from serial form into parallel form.

When serial data is transmitted by using only SDI00, the data is 1-bit data. When all signal lines SDI00 to SDI03 are used, 4-bit data can be transmitted.

When data is read from the flash memory 230, the operation is performed as followed. First, data is read in the form of parallel data of a plurality of bits from the flash memory 230 disposed in the data storage device 200 and converted by the interface 216 into serial data. The resultant serial data is supplied to the host device 300 via the bidirectional data signal lines (SDIO0 to SDIO3).

A register 211 includes a status register and a parameter register. Data is input and output to or from the register 211 via the bidirectional data signal lines (SDI00 to SDI03). The bidirectional data signal lines (SDI00 to SDI03) are used to transmit control data or write or read general data. In accordance with control data given via the bidirectional data signal lines (SDI00 to SDI03), accessing of an internal memory in the data storage device 200 is controlled.

A page buffer 212 is a data storage area used to temporarily store data when the data is transferred between the interface 216 and the flash memory 230. An attribute ROM 213 stores physical attribute information of the control IC 210. An OSC controller 215 generates a clock signal that is used in the control IC 210 to control the operation timing of the control IC 210.

A controller 214 controls the data transfer from/to the flash memory 230, and includes a sequencer 221 serving as a control unit such as a CPU, an error correction code (ECC) generator 222 for adding an error correction code to data to be transferred or detecting an error in received data, and a flash interface 223 serving to interface with the flash memory 230. The error correction performed by the error correction code generator 222 ensures high reliability of data stored in the flash memory 230.

The data storage device 200 has a power supply terminal VCC, data input/output terminals (SDIO0 to SDIO3) for connection with the host device 300, a bus state input terminal (BS), a serial clock input terminal (SCLK), an insertion detection terminal (INS), and a ground terminal (VSS).

Data is input/output to/from the data input/output terminals (SDIO0 to SDIO3) via the bidirectional data lines. A bus state (BS) signal is input to the bus state input terminal. The bus state (BS) signal indicates the data status of data on the bidirectional data signal lines connected with the respective data input/output terminals (SDI00 to SD103). For example, the state changes in response to control data input before data accessing is performed or data given on the data signal lines (SDI00 to SD103), and the data storage device 200 performs a process depending on the state.

A data transfer clock signal is supplied to the serial clock input terminal (SCLK). Transferring of control data and other general data is performed in accordance with the data transfer clock signal. The data transfer clock signal is controlled according to the bus state (BS) signal.

Now referring to FIG. 6, the detailed structure of the flash memory (FMEM) 230 in the data storage device 200 shown in FIG. 5 are described below.

As described above, blocks and pages are defined in the flash memory, wherein deletion of data is performed in units of blocks and reading/writing of data is performed in units of pages. The flash memory includes a plurality of blocks, and each block includes a plurality of pages. Each page includes, for example, a 512-byte data storage area 121 and a 16-byte extension area 122 in which parity data or the like is written. The data sizes of the data storage area and the extension area vary depending on the flash memory. For example, the data storage device may be configured so as to have a 2048-byte data area and a 64-byte extension area.

Figure 6:
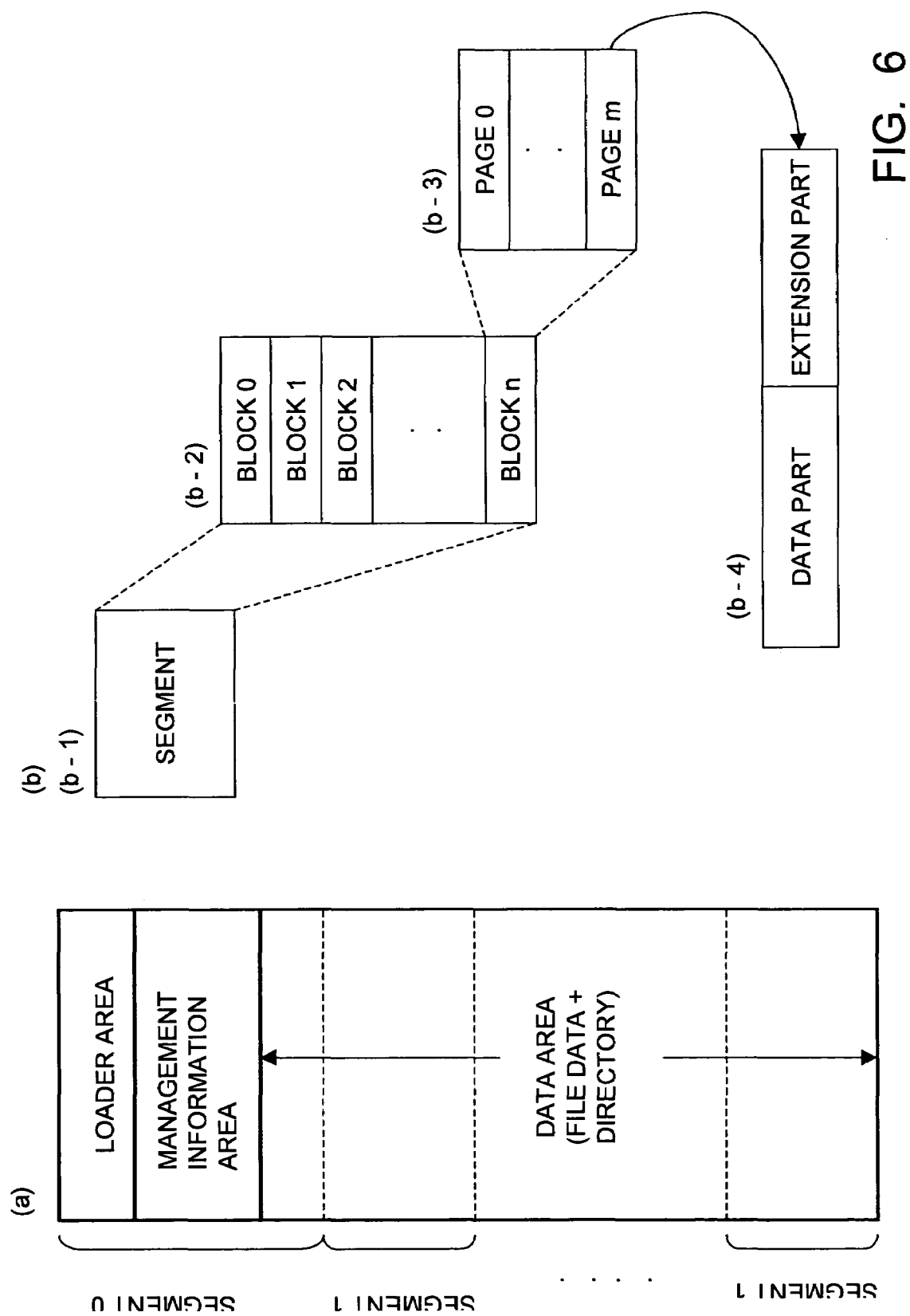
FIG. 6 is a diagram showing a data storage configuration of a flash memory according to the present invention.

FIG. 6(*a*) shows a data structure of the flash memory. The storage area of the flash memory in divided into segments each having a fixed data size such as 4 MB (mega bytes), 8 MB, or 16 MB. The number of segments of one flash memory depends on the storage capacity of the flash memory. In the specific example shown in FIG. 6(*a*), the flash memory has eight segments denoted as segment 0 to segment 7.

In a loader area, load data necessary in a starting operation is stored. When electric power is turned on, the control IC 210 first reads information necessary in the starting operation from the loader area. A management area includes blocks in which file management information including a logical-physical address conversion table and a FAT is stored and the management area also includes unused blocks reserved as alternate blocks. A data area includes blocks used to store user data such as image data, audio data, text data, and/or a program. In addition to such actual data, directory information indicating a starting address of each data is also stored as index information in the data area. Details of index information will be described later.

As shown in FIG. 6(*b*), each segment (b-1) is divided into data units called blocks each having a fixed length. As shown in FIG. 6(*b*-2), blocks of one segment are denoted as block 0 to block n. In the case in which each segment has 512 blocks, n is 511. Note that when a segment has a block incapable of storing data or when a segment has a bad block in which an error occurs when data is written in the block, the value n indicating the number of effective blocks in which data can be written is smaller than 511, As shown in FIG. 6(*b*-3), each block is divided into pages 0 to m. Each page includes, as shown in FIG. 6(*b*-4), a data part with a length of, for example, 512 bytes and an extension part with a length of, for example, 16 bytes. The details of the extension part will be described later.

Each block has the same page structure including a data part and an extension part shown in FIG. 6(*b*-4) regardless of whether the block is located in the loader area, the management information area, or the data area. In the flash memory, reading of data and writing of data are performed in units of pages, and deleting of data is performed in units of blocks.

Writing of data is allowed only in a page whose data has been deleted. Therefore, in practice, writing or rewriting of data is performed in units of blocks.

Note that in the present invention, writing of information in the management information area (for example, writing of file management information such as the logical-physical address conversion table or the FAT) is performed in a special manner that will be described later.

Figure 7:
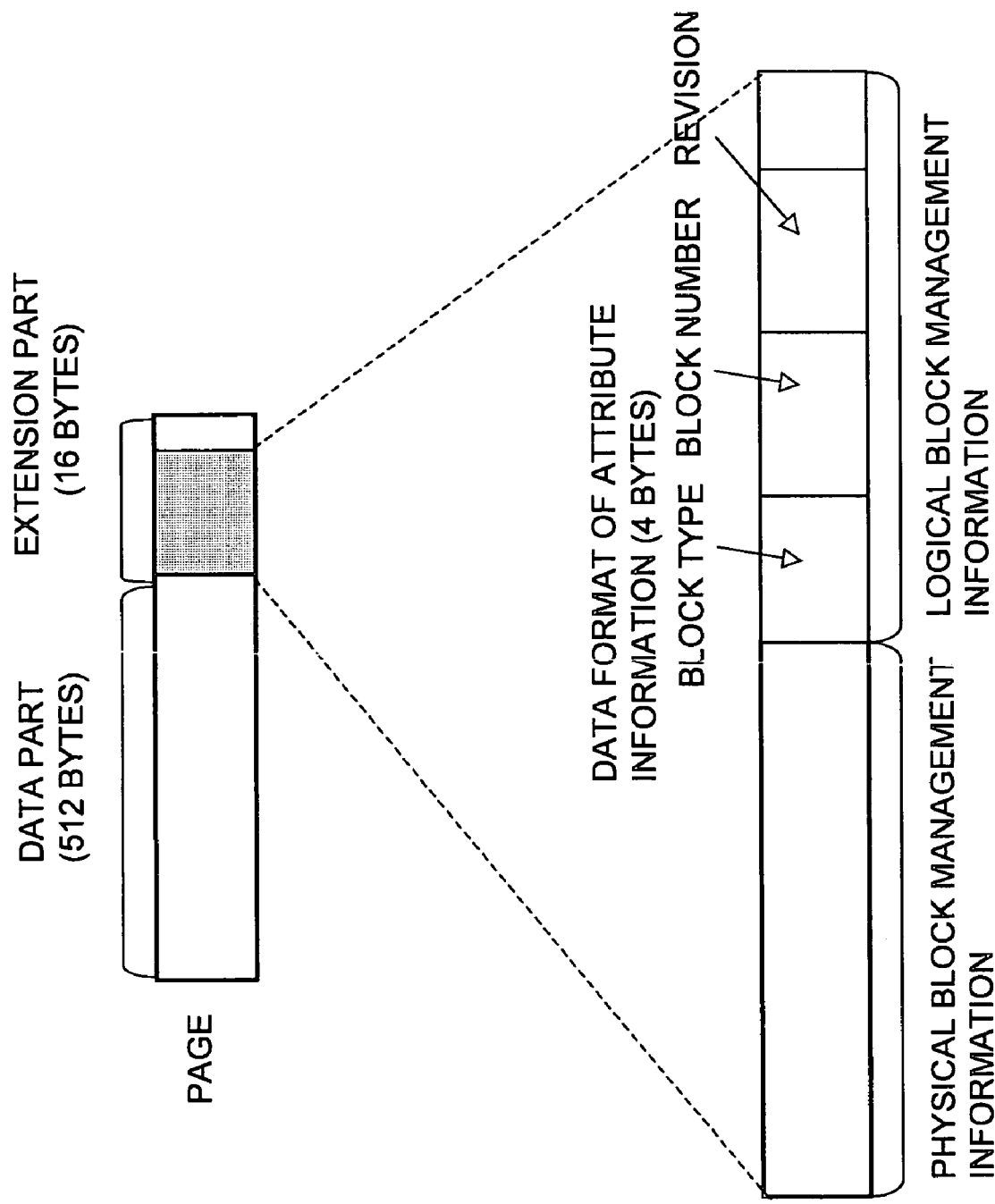
FIG. 7 is a diagram showing a page configuration of a flash memory according to the present invention.

Referring to FIG. 7, the page structure is described below. As shown in FIG. 7, each page includes a data part and an extension part. The type of data stored in the data part varies depending on whether the data is stored in the loader area, the management information area, or the data area. For example, in a page of a block in the loader area, information used by the control IC in the starting operation is stored. On the other hand, in a page of a block in the management information area, Information, for example, file management information such as the logical-physical conversion table or the FAT is stored. In a page of a block in the data area, Various data files associated with user data such as image data, audio data, text data, or a program and also directory information are stored.

In the extension part of each page, for example, an error correction code (ECC) and attribute information are stored. As shown in FIG. 7, attribute information includes logical block management information and physical block management information.

Figure 8:
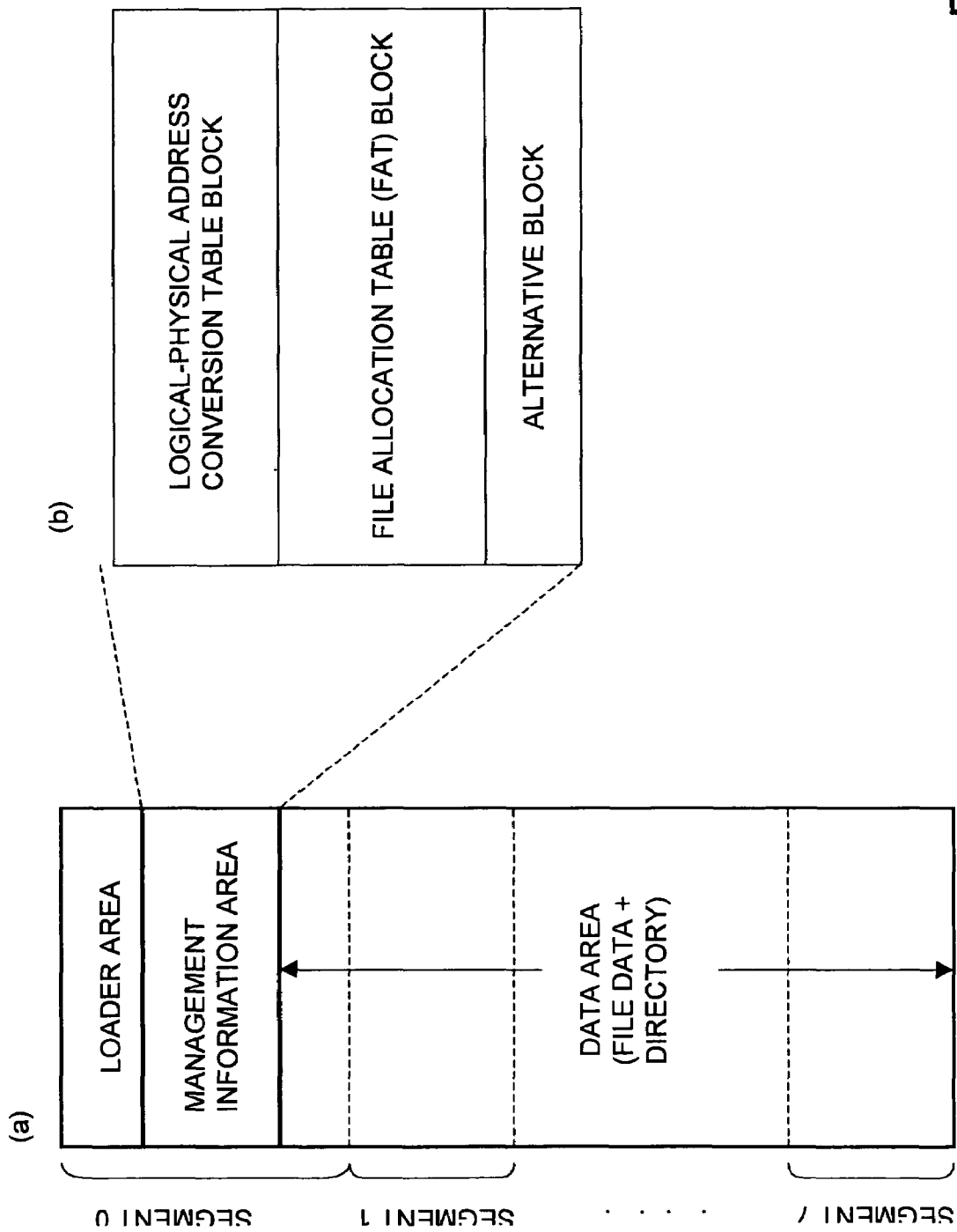
FIG. 8 is a diagram showing information stored in a management information area of a flash memory according to the present invention.

FIG. 8 shows the detailed structure of the management information area. The management information area includes a logical-physical address conversion table block, a file management information block, and an alternate block, wherein a logical-physical address conversion table which is a table used to convert a logical address specified by a host device into a physical address is stored in the logical-physical address conversion table block, file management information, such as a FAT, indicating a block-to-block concatenation of data stored in the flash memory is stored in the file management information block, and the alternate block is an unused block reserved for use when a failed block appears or for use as a new block in an updating process.

In the present invention, when the logical-physical conversion table or the file management information (FAT) is updated, updated information is written using a plurality of blocks. More specifically, a pair of different blocks is assigned for use to write one page of the logical-physical address conversion table or the FAT data, and updated data is written by alternately using pages of two blocks of the assigned pair. This allows the original logical-physical address conversion table or FAT is preserved without being deleted when new logical-physical address conversion table or FAT is written in the updating process. Even if the updated logical-physical address conversion table or the updated FAT is lost, the immediately previous management information can be used. For example, data can be accessed using the previous management information, and furthermore, re-updating of the management information can be performed using the existing management information.

In the following description, by way of example, it is assumed that a FAT widely used as file management information in a hard disk is employed herein as file management information. Note that in the present invention, the file management information is not limited to the FAT, but other types of file management information such as NTFS or HFS may also be used.

Logical block management information (FIG. 7) serving as attribute information of blocks of the management information area of the flash memory and the data structure thereof are described below with reference to FIG. 9.

In the management information area of the flash memory, as described above, the file management information such as the logical-physical address conversion table and the FAT are stored, and the management information area also includes alternate blocks. FIG. 9 shows the data structure of logical block management information which is one of attributes set to pages of each block and also shows contents of the logical block management information.

The data structure of the logical block management information is different depending on the block type, the logical block management information includes data indicating the block type. For example, the block type is represented by 2 bits such that [00] indicates blocks for the logical-physical address conversion table, [01] indicates blocks for the file management information such as the FAT, and [01] indicates alternate blocks.

In logical-physical address conversion table blocks, information necessary to convert logical addresses to corresponding physical addresses is stored in each data part, and a block number indicating a segment corresponding to the logical-physical address conversion table stored in the data part is stored in the logical block management information. Note that each physical block is assigned a logical address, and a logical-physical address conversion table is provided for each segment. Furthermore, an update flag indicating whether the logical-physical address conversion table stored in the data part is being currently subjected to an updating process, and revision data indicating the revision number that is incremented by one each time updating is performed are also described in the logical block management information. The file management information defines storage units called sectors each having a length of 512 bytes and also defines clusters each including n sectors and thus having a length of 512×n bytes, whereby the file management information manages locations of data in units of clusters.

Each logical address indicates a sector address. When an address conversion is performed, lower-order bits of a sector address are used to indicate a page in a physical block. For example, when each block includes 32 pages, 5 bits in lower-order positions are used to indicate a page address. Herein, it is assumed that page addresses uniquely corresponding to physical pages in a block, although pages may be employed as units of the logical address.

In file management information blocks, a FAT is stored as file management information in a data part. To store all FAT data, a plurality of file management information blocks are needed. Thus, in the logical block management information, the block number corresponding to the logical address of the FAT stored in the data part and revision data indicating the revision number that is incremented by one each time updating is performed are described.

Alternate blocks are physical blocks reserved for use when a failed block appears. Data in the alternate blocks has been deleted and the alternate blocks are not assigned any logical address.

Figure 10:
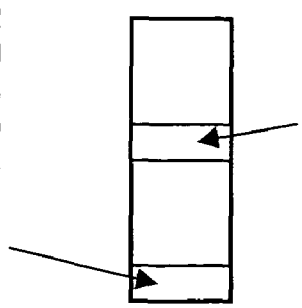
FIG. 10 is a diagram showing physical block management information indicating attribute information of information stored in a management information area of a flash memory according to the present invention.

Now referring to FIG. 10, logical block management information (FIG. 7) serving as attribute information of blocks of the management information area of the flash memory and the data structure thereof are described below.

The logical block management information has the same structure regardless of whether a logical-physical address conversion table, file management information such as a FAT, or an alternate block is stored in the management information area of the flash memory. As shown in FIG. 10, the physical block management information includes a bad block flag and a delete flag. In the bad block flag, [1] is stored to indicate that the block is a good block capable of correctly reading/writing data or [0] is stored to indicate that the block is bad. In the delete flag, [1] is stored to indicate that the block is not deleted or [0] is stored to indicate that the block has been deleted. For example, for a block which is assigned a logical address and is in use, the bad block flag is set to [1] and the delete flag is set to [1]. On the other hand, for a good alternate block, the bad block flag is set to [1] and the delete flag is set to [1].

[Updating of Management Information]

When file data stored in the flash memory is updated, management information including a logical-physical address conversion table, and file management information (FAT) is updated as described below.

In the flash memory, as described earlier, reading of data and writing of data are performed in units of pages, and deleting of data is performed in units of blocks. Writing of data is allowed only in a page whose data has been deleted. When data is read from the flash memory and updated data is written in the flash memory, the updated data is not overwritten on a page where the original data was located, but a page whose data has been deleted into a writable state is detected and the updated data is written in this detected page. Therefore, updating of a physical address indicating a location at which data is written is frequently performed each time updating of data is performed.

Although the data storage location and the physical address are changed when data is updated, the host device is allowed to use the same logical address for the updated data as the logical address used for the original data regardless of whether the physical address is changed or not. To this end, the logical-physical address conversion table is updated each time data is updated.

The process of updating the logical-physical address conversion table, which is performed each time data is updated, is described below. FIG. 11(a) schematically shows four blocks included in a certain block. Of those four blocks, three blocks are each assigned a fixed physical address, and one block is an alternate block. The physical addresses are determined in the physical arrangement order of blocks, and the physical addresses assigned to respective blocks are not changed but maintained. Herein, we assume that [0x11], [0x12], [0x13], and [0x14] are assigned as physical addresses to the four blocks shown in FIG. 11(a). Herein "0x" indicates that a two-digit value following "0x" is represented in hexadecimal.

Herein, we assume that in a state in which data is not yet updated, a logical address (0x02) is assigned to the physical address [0x11], a logical address (0x03) to the physical address [0x12], and a logical address (0x04) to the physical address [0x14], as shown in FIG. 11(a). For the physical address [0x13], no logical address is assigned because the alternate block is located at this physical address.

Herein, we further assume that file data written by the host device is stored in block 0 and block 1 at physical addresses [0x11] and [0x12].

In this state, if the host device reads data at the logical address (0x02), the logical-physical address conversion table converts the logical address (0x02) to the physical address [0x11] and outputs data stored in the block 0 to the host device.

Herein, when the host device updates the data stored in the block 0 and rewrites the data into the flash memory, the data is not overwritten in the page in which the original data is stored, but a page whose data has been deleted into a writable state is detected and the updated data is written in this detected page, as described earlier. In this case, the original data is retained in the block 0 without being deleted, and the updated data is written in an alternate block (the block 2 in this specific case) whose data has been deleted.

Furthermore, in order to maintain the logical address of the updated data at the same logical address as the logical address (0x02) assigned to the original data, the logical-physical address conversion table is updated. More specifically, as shown in FIG. 11(b), the logical address (0x02) is assigned to the physical address [0x13] of the block 2 in which the updated data is stored, and the data stored in the block 0 at the physical address [0x11] is deleted before or after the updated is written into the block 2 such that the block 0 becomes a new alternate block. The updating of the logical-physical address conversion table in the above-described manner allows the host device to use the same logical address in accessing data regardless of whether the data has been updated.

Note that logical addresses are assigned to respective data stored in certain blocks, and the logical addresses are managed by the FAT file system as will be described later. In contrast, physical addresses are fixedly assigned to respective blocks.

By swapping blocks in the above-described manner, it becomes possible to prevent only particular storage areas (blocks) from being accessed very frequently, and thus it becomes possible to increase the overall life of the flash memory having the upper limit in terms of the number of times rewriting is performed.

Furthermore, as described above, by updating the logical-physical address conversion table each time data is updated, it becomes possible to use the same logical address for that data. Note that the logical-physical address conversion table is provided for each segment, and thus when data is updated, the resultant data is not written in another different segment.

FIG. 12 shows an example of a manner in which the logical-physical address conversion table is updated in response to updating of data. As described above, the logical-physical address conversion table is stored in the management information area of the flash memory and updated when data is updated.

Figure 11:
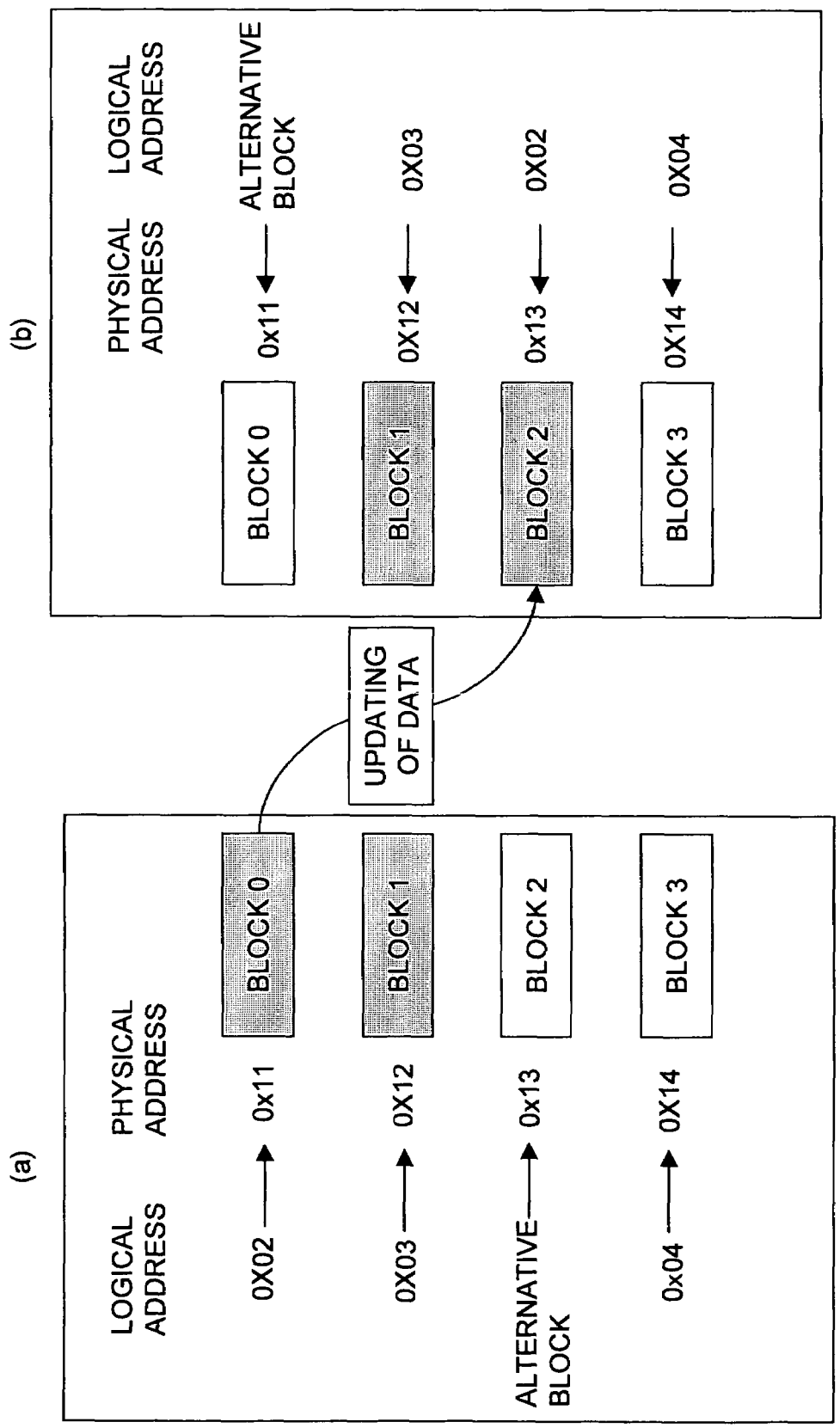
FIG. 11 is a diagram showing a process of updating a logical-physical address conversion table of a flash memory.

In the specific example shown in FIG. 12, the logical-physical address conversion table is updated in response to the updating of data shown in FIG. 11. FIG. 12(a) shows the logical-physical address conversion table in a state in which it is not yet updated, and FIG. 12(b) shows the logical-physical address conversion table in a state in which it is updated. The logical-physical address conversion table is described in the form of a series of pairs of a physical address and a corresponding logical address.

In the present example, the correspondence between (logical address) and [physical address] in the state before the updating is described as follows:
 (0x02) [0x11]
 (0x03) [0x12]
 (0x04) [0x14]
 (0x05) [0x15]

On the other hand, the correspondence between (logical address) and [physical address] after the updating is described as follows:
 (0x02) [0x13]
 (0x03) [0x12]
 (0x04) [0x14]
 (0x05) [0x15]

In the above process, data in the block at the physical address [0x11] is deleted, and a corresponding alteration is made of the physical block management information.

In the present invention, the changed logical-physical conversion table is written alternately in pages of two blocks. That is, a pair of different blocks is assigned to one page of the data of the logical-physical address conversion table, and the changed logical-physical conversion table is written by alternately using pages of two blocks of the assigned pair. This allows the original logical-physical address conversion table or FAT is retained in a page of one of two blocks without being deleted. Thus, even if the updated logical-physical address conversion table is lost, the preserved original logical-physical address conversion table can be used, as will be described in further detail later.

Figure 13:
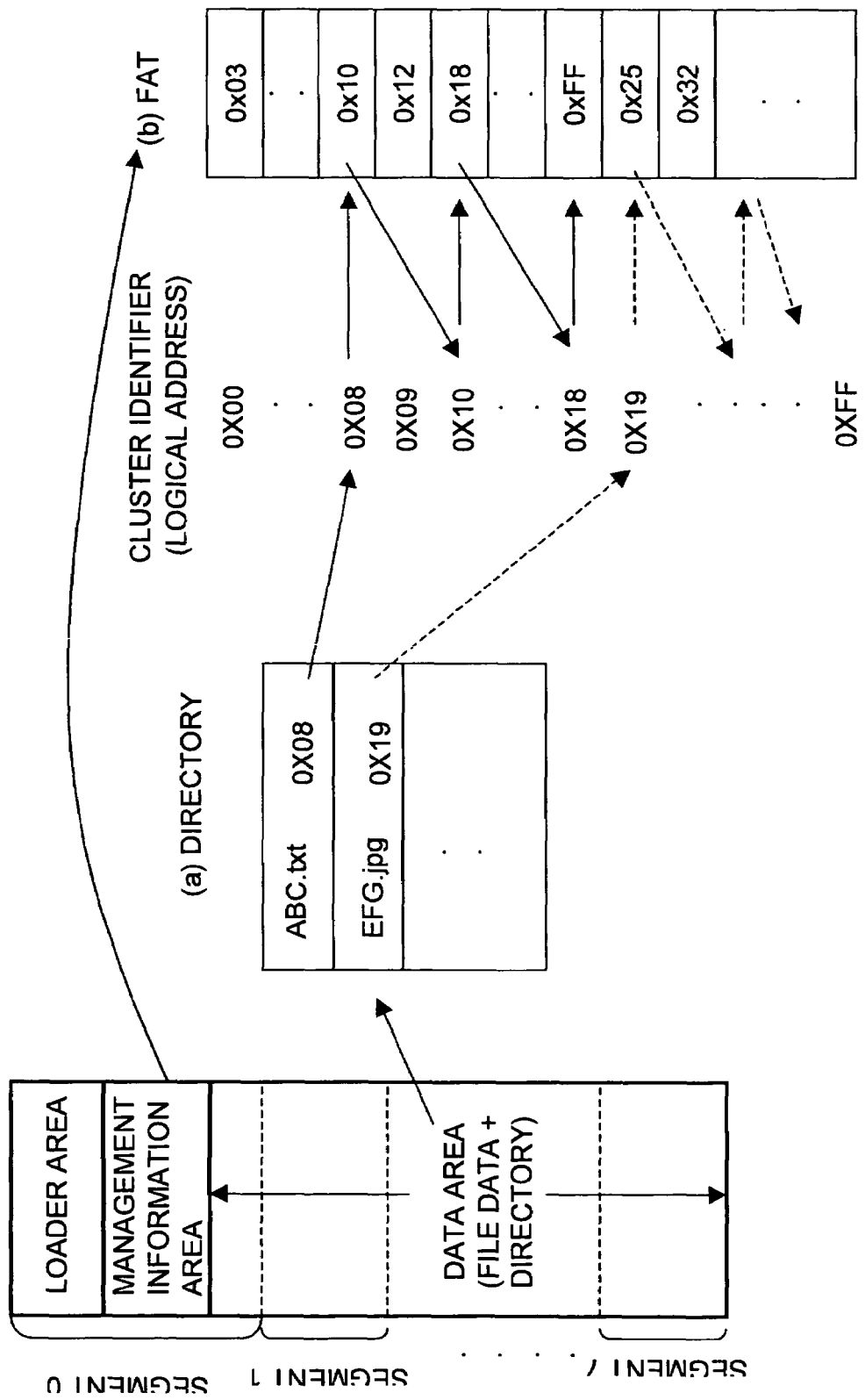
FIG. 13 is a diagram showing a process of updating a FAT of a flash memory.

As described above, swapping of blocks causes a change in the correspondence between the physical address and the logical address. Therefore, in order to correctly allow accessing to data in the flash memory, the logical-physical address conversion table indicating the current correspondence between the physical address and the logical address is needed. By referring to the logical-physical address conversion table, the file management information (FAT) determines a physical address corresponding to a specified logical address whereby it becomes possible to access a block at the determined physical address corresponding to the specified logical address. Now referring to FIG. 13, the manner of using the file management information such as the FAT is described.

Data files stored in the flash memory are managed in units of clusters. Physical sectors in the data area of the flash memory correspond to pages which are units in reading and writing data from or into the flash memory. On the other hand, clusters each including a plurality of sectors are used as management units in the file management information (FAT). Clusters are units that form a file. In many cases, when a data file is stored in the flash memory, the data file is stored over a plurality of clusters. The FAT is a table indicating a cluster-to-cluster concatenation of dispersed clusters in which a data file is stored. An entry of the FAT stores information indicating a cluster-to-cluster concatenation of logical addresses corresponding in a one-to-one fashion to clusters or blocks of the flash memory. The starting cluster of the file is described together with the file name in a directory.

FIG. 13(a) shows a directory of a data file stored in the data area of the flash memory and FIG. 13(b) shows a FAT serving as file management information stored in the management information area.

Because information indicating a cluster-to-cluster concatenation of clusters which are units used to store data is described in the form o a table in the FAT, when a data file is stored over a plurality of clusters, it is possible to know locations of all clusters of the data file by acquiring the cluster-to-cluster concatenation information described in the FAT, and thus accessing to all data of the data file is possible. Each cluster corresponds to one block of the flash memory. Thus, when one data file is stored over a plurality of blocks (corresponding to clusters) of the flash memory, concatenation information associated with the plurality of blocks is described in the FAT. Clusters described in the concatenation information in the FAT are identified cluster identifiers corresponding to logical addresses used in the logical-physical address conversion table.

In a directory stored in the data area of the flash memory, a file name, a file name extension, and a cluster identifier of a starting cluster are described, as shown in FIG. 13(a). The host device can know a cluster-to-cluster concatenation of clusters of file data by referring to the FAT according to a cluster identifier of a starting cluster described in a directory, and can sequentially acquire cluster identifiers from the concatenation information. Cluster identifies correspond to logical addresses. Thus, it is possible to acquire physical addresses by applying the logical addresses to the logical-physical address conversion table and it is possible to further acquire data stored at the physical addresses.

In an example of a file [ABC.txt] described in the directory shown in FIG. 13(a), the identifier of the starting cluster is (0x08), 0x10 is stored as a cluster identifier pointing to a next cluster at 0x08 in the FAT, 0x18 is stored at 0x10, and 0xFF indicating the end of file data is stored at 0x18. Thus, it is possible to know that the file [ABC.txt] is stored in order (0x08), (0x10), and (0x18). On the other hand, in the case of a file [EFG.jpg], the identifier of the starting cluster is (0x19), 0x25 is stored as a cluster identifier pointing to a next cluster at 0x19 in the FAT, and following cluster identifies are stored in a similar manner. Thus, it is possible to know locations of clusters of the file [EFG.jpg] by sequentially detecting cluster identifies described in the FAT.

As described earlier, cluster identifiers (cluster addresses) correspond to logical addresses. Thus, in the operation of accessing data, it is possible to know which physical locations in the flash memory the file is stored at, on the basis of a value obtained by removing the page address from the cluster address acquired from the FAT.

The FAT is updated as required when new data is added or data is rewritten. When one cluster includes 32 sectors, one cluster has a size of 16 Kbytes. When a certain data file is updated, if the resultant data file has a greater size than the original data size, it is necessary to acquire a new cluster. In this case, it is necessary to rewrite the FAT, that is, updating of the FAT is necessary.

The resultant updated FAT is stored in the management information area of the flash memory. In the present invention, in the process of writing the updated FAT, as in writing of the logical-physical address conversion table, a pair of blocks is assigned for use to store one page of FAT data, and updated data is written by alternately using a page of one of two blocks of the assigned pair and a page of the other block of the pair. This allows the original FAT to be preserved without being deleted when new updated FAT is written. Even if the updated FAT is lost, the immediately previous FAT can be used. The process of updating the FAT is descried in further detail below.

The process of updating a logical-physical address conversion table or file management information such as a FAT stored in the management information area (FIG. 6) of a flash memory is described.

Figure 14:
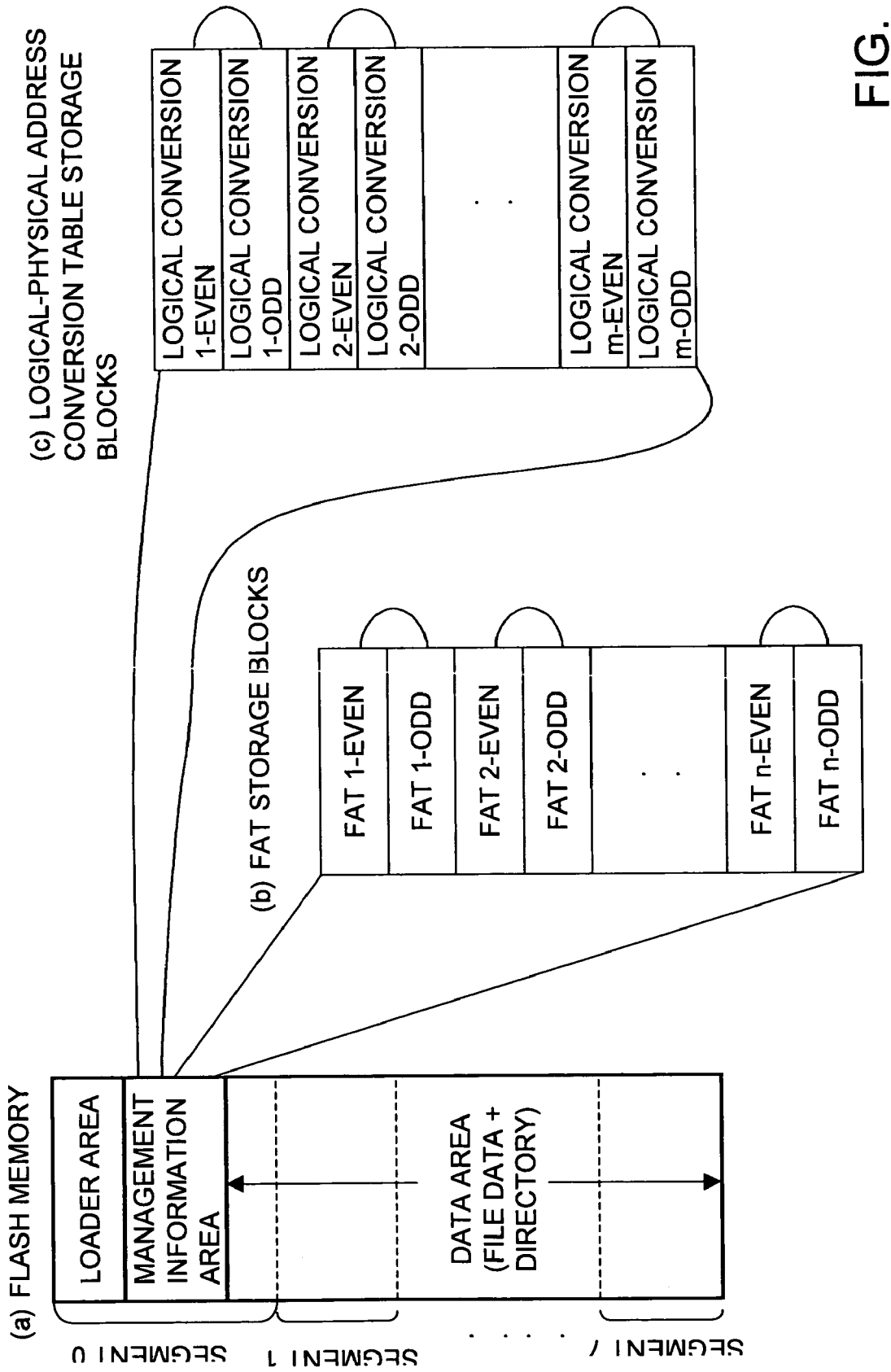
FIG. 14 is a diagram showing a manner in which a logical-physical address conversion table and a FAT are stored in a flash memory according to the present invention.

FIG. 14 is a diagram showing a manner in which a logical-physical address conversion table and a FAT are stored in a flash memory according to the present invention. As shown in FIG. 14(a), management information including the logical-physical address conversion table and the FAT is stored in the management information area of the flash memory.

As shown in FIG. 14(b), two different blocks are assigned as a block pair to each FAT data. More specifically, as shown in FIG. 14(b), a block pair consisting of a block "FAT 1-even" and a block "FAT 1-odd", a block pair consisting of a block "FAT 2-even" and a block "FAT 2-odd", . . . , a block pair consisting of a block "FAT n-even" and a block "FAT n-odd" are set for use to store respective FAT data. Although in this specific example shown in FIG. 14(b), adjacent blocks are used as a block pair, blocks in each pair do not necessarily need to be at adjacent locations.

Similarly, as shown in FIG. 14(c), two different blocks are assigned as a block pair to each logical-physical address conversion table data. More specifically, as shown in FIG. 14(c), a block pair consisting of a block "logical-physical address conversion table 1-even" and a block "logical-physical address conversion table 1-odd" a block pair consisting of a block "logical-physical address conversion table 2-even"

and a block "logical-physical address conversion table 2-odd", . . . , a block pair consisting of a block "logical-physical address conversion table n-even" and a block "logical-physical address conversion table n-odd" are set for use to store respective logical-physical address conversion table data.

Note that the notations "even" and "odd" are used only to distinguish two blocks of each block pair from each other, two blocks of each pair may be both odd ones or may be both even ones, as long as two blocks of each pair are different from each other.

When updated FAT data or updated logical-physical address conversion table is written, even and odd blocks are alternately used. For example, when the current FAT data is stored in a page of the block "FAT 1-odd", updated data is written in a page of the block "FAT 1-even". This means that the current data is retained in the page of the block "FAT 1-odd". On the other hand, when the current FAT data is stored in a page of the block "FAT 1-even", updated data is written in a page of the block "FAT 1-odd". Also in updating of a logical-physical address conversion table, updated data is written by alternately using even and odd blocks.

Figure 15:
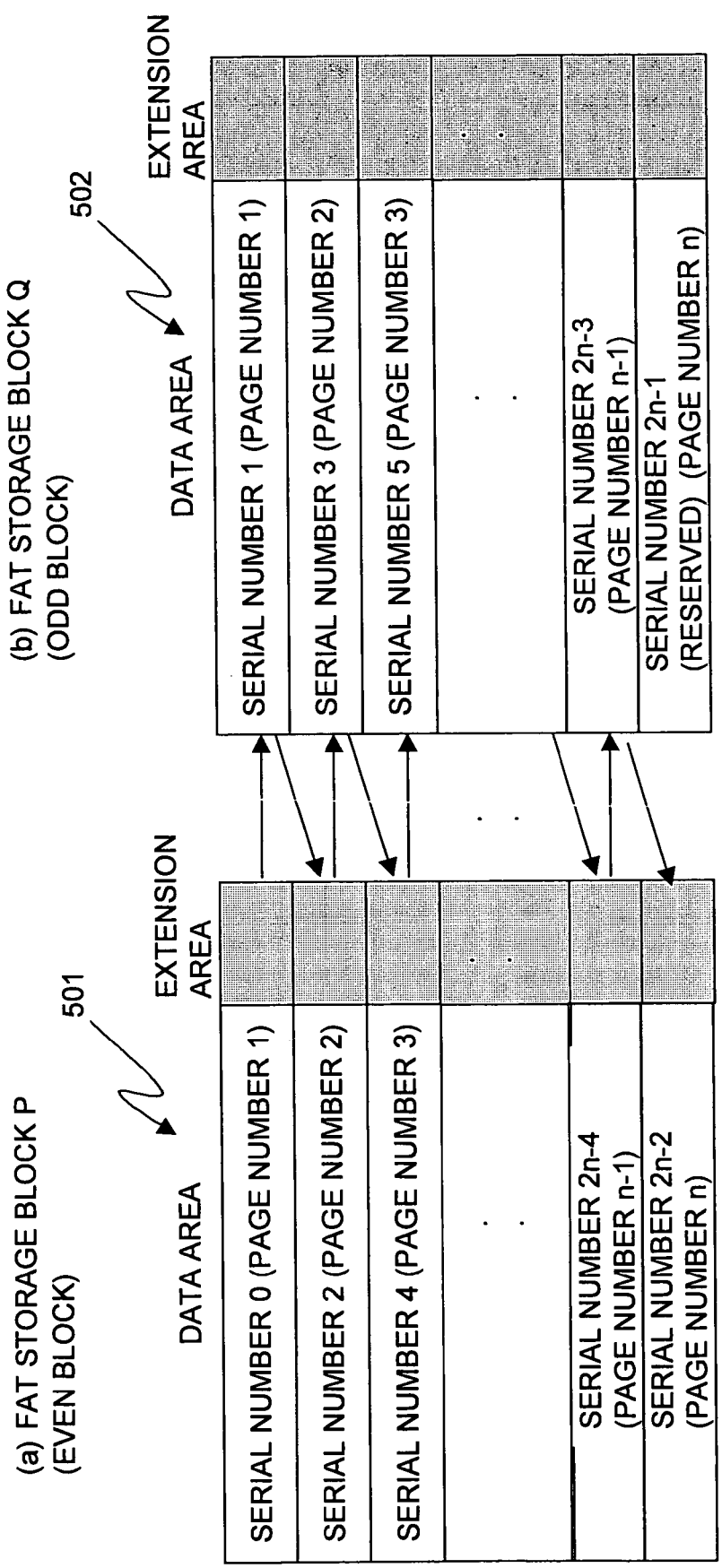
FIG. 15 is a diagram showing a structure of blocks in which a logical-physical address conversion table or a FAT is stored, in a flash memory according to the present invention.

FIG. 15 shows the process of updating a logical-physical address conversion table or file management information such as a FAT stored in the management information area (FIG. 6) of the flash memory. In the present invention, as described above, two different blocks are assigned as a block pair to each page of logical-physical address conversion table data, and two blocks of the block pair are alternately used when updated data is written. Also in updating of file management information such as a FAT, two different blocks are assigned as a block pair to FAT data, and two blocks of the block pair are alternately used when updated data is written. The process of updating data is basically the same for both the logical-physical address conversion table and the FAT, and thus the following discussion is made only for the FAT updating process with reference to FIG. 15.

As described above with reference to FIG. 14, two blocks are assigned as a block pair for use to write an updated FAT in the management information area of the flash memory. In the specific example shown in FIG. 15, a FAT storage block P (even block) 501 shown in FIG. 15(a) and a FAT storage block Q (odd block) 502 shown in FIG. 15(b) are assigned as a block pair.

Pages of the even and odd blocks are assigned serial numbers (revision numbers) starting from 0, as shown in FIG. 15. Each time FAT data is updated, the updated data is written in a new page of a block in order of serial number. More specifically, as shown in FIG. 15, pages of the even block 501 are assigned page numbers 0, 2, 4, 6, and so on, while pages of the odd block 502 are assigned page numbers 1, 3, 5, 7, and so on. Each time the FAT data is updated, the updated data is written in a page in order 0, 1, 2, 3, 4, 5, 6, 7, and so on.

Each page also has a page number assigned independently for the even block 501 and the odd block 502. For example, the page with serial number 0 and the page with serial number 1 have page number 0, the page with serial number 2 and the page with serial number 3 have page number 1, and so on.

Note that the serial numbers assigned to respective pages of the even block 501 and the odd block 502 are used only for convenience of explanation. That is, when the host device writes updated FAT information, a page is specified not by a serial number but by a page number as counted with respect to a reference page in a block. More specifically, a page at which to write updated management data is specified as, for example, an Nth page with respect to a reference page in a block.

In the present invention, the current management information such as a FAT serving as file management information or a logical-physical address conversion table is retained in a page of one of two blocks of a block pair, and new updated data is written in a page of the other one of the two blocks of the block pair.

In the present invention, as described above, when management information is updated, the updated management information is written by alternately using a page of one of two blocks of a block pair and a page of the other one of the two blocks of the block pair. When there is no available page in a block pair, an alternate block is allocated as a new block and updated management information is written in a first page of the new block. In this case, data in a block other than the block in which the immediately previous management information is stored is deleted.

In the present invention, two physical addresses of two respective blocks of a block pair are related to one logical address defined in management information such as a FAT used as file management information or a logical-physical address conversion table. The controller of the data storage device acquires two physical addresses related to a logical address of file management information to be updated. The controller determines that the two blocks at the two respective physical addresses are of a block pair for use to store updated file management information, and the controller writes the updated information by alternately using the two blocks of the block pair.

Figure 16:
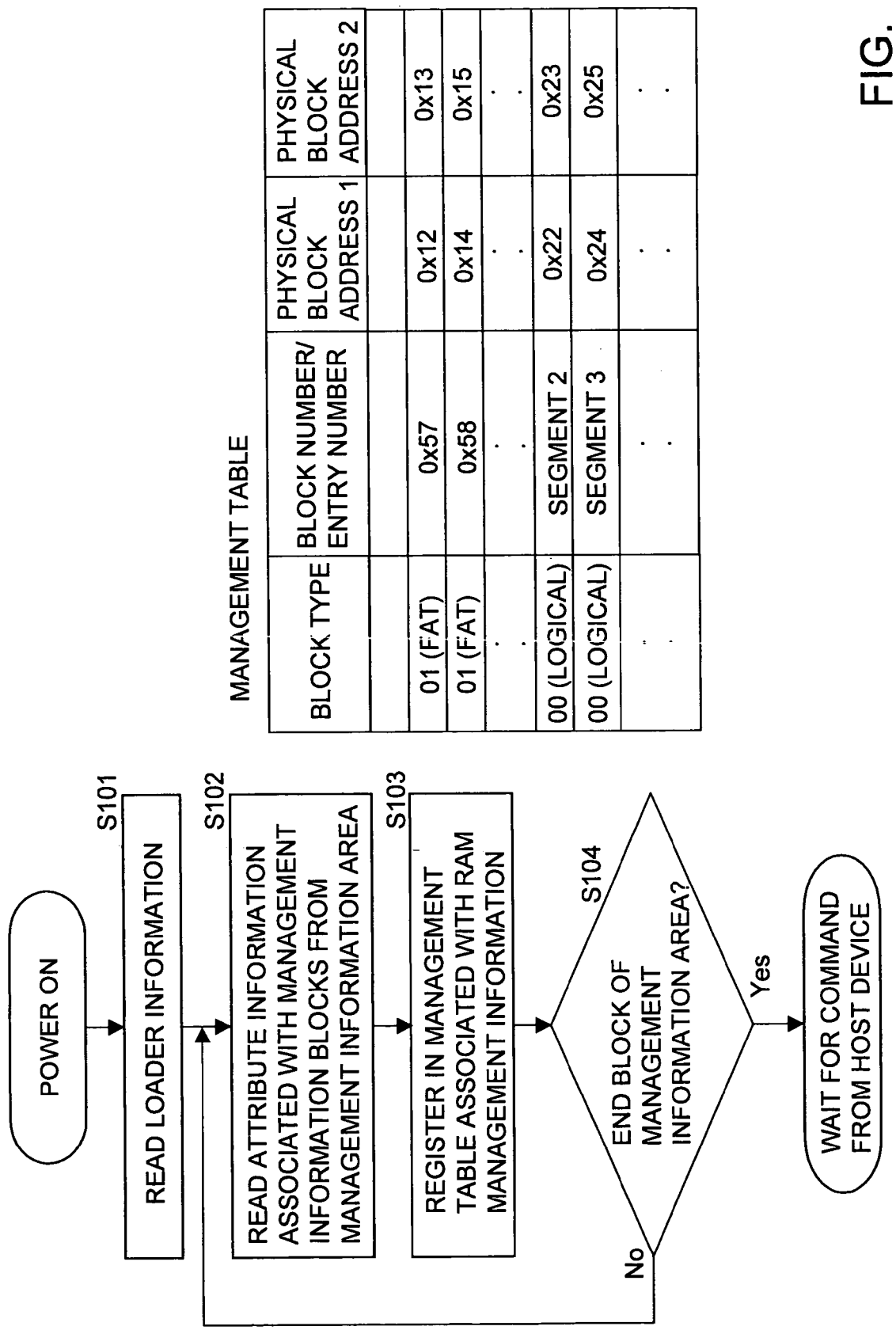
FIG. 16 shows a flow of an initial setting process performed in a host device having a flash memory according to the present invention and also shows a management table of the flash memory.

Referring to FIG. 16 and other figures, the process performed by the host device to write and read data into or from the flash memory is described below.

First, an initialization process performed by the host device (for example, a PC), on which the memory card using the above-described flash memory is mounted, at the beginning of the process to bring the memory card into a usable state is described with reference to FIG. 16.

First, in step S101, the host device reads information stored in the loader area (FIG. 6) of the flash memory. In the loader area of the flash memory, initial information according to which the control IC operates at the beginning of the operation is stored.

In step S102, attribute information associated with each block stored in the management information area of the flash memory is read. In the next step S103, entries of information read in step S102 are registered in the management table in a ROM. If it is determined in step S104 that attribute information stored in the management information area has been registered in the management table for all blocks, then the process waits for a command such as a data read command or a data write command from the host device.

The management table, produced on the basis of the attribute information associated with respective blocks read from the management information area of the flash memory, includes fields in which the block type, the block number/entry number, the physical address block 1, and the physical address block 2 are described, as shown on the right-hand side of FIG. 16.

As described earlier with reference to FIG. 8 and other figures, the management information area of the flash memory includes a logical-physical address conversion table, a FAT used as file management information, and alternate blocks. On the basis of data described in the attribute information (FIGS. 7 and 9) associated with respective blocks, the management table shown in FIG. 16 is produced.

Now, the logical-physical address conversion table and the FAT serving as the file management information according to the present invention are described in further detail below. As shown in FIG. 16, for a block used to store a FAT, a block type ID is stored in the block type field to indicate that the block is a FAT block. In the block number/entry number field, a logical address in the logical format calculated from a sector address, as described earlier with reference to FIG. 9, is described. The logical address described in this field indicates the logical address of the FAT data. In the field of physical address block 1 and the field of physical address block 2, physical addresses of an even block and an odd block described above are stored.

When the FAT data corresponding to the logical address described in the block number/entry number field is updated, updated FAT data is written by alternately using a page in the even block specified by the physical address block 1 and a page in the odd block specified by the physical address block 2.

When all attribute information associated with blocks has been read from the management information area of the flash memory and the management table has been produced on the RAM, it becomes possible to write or read data into or from the flash memory.

Figure 17:
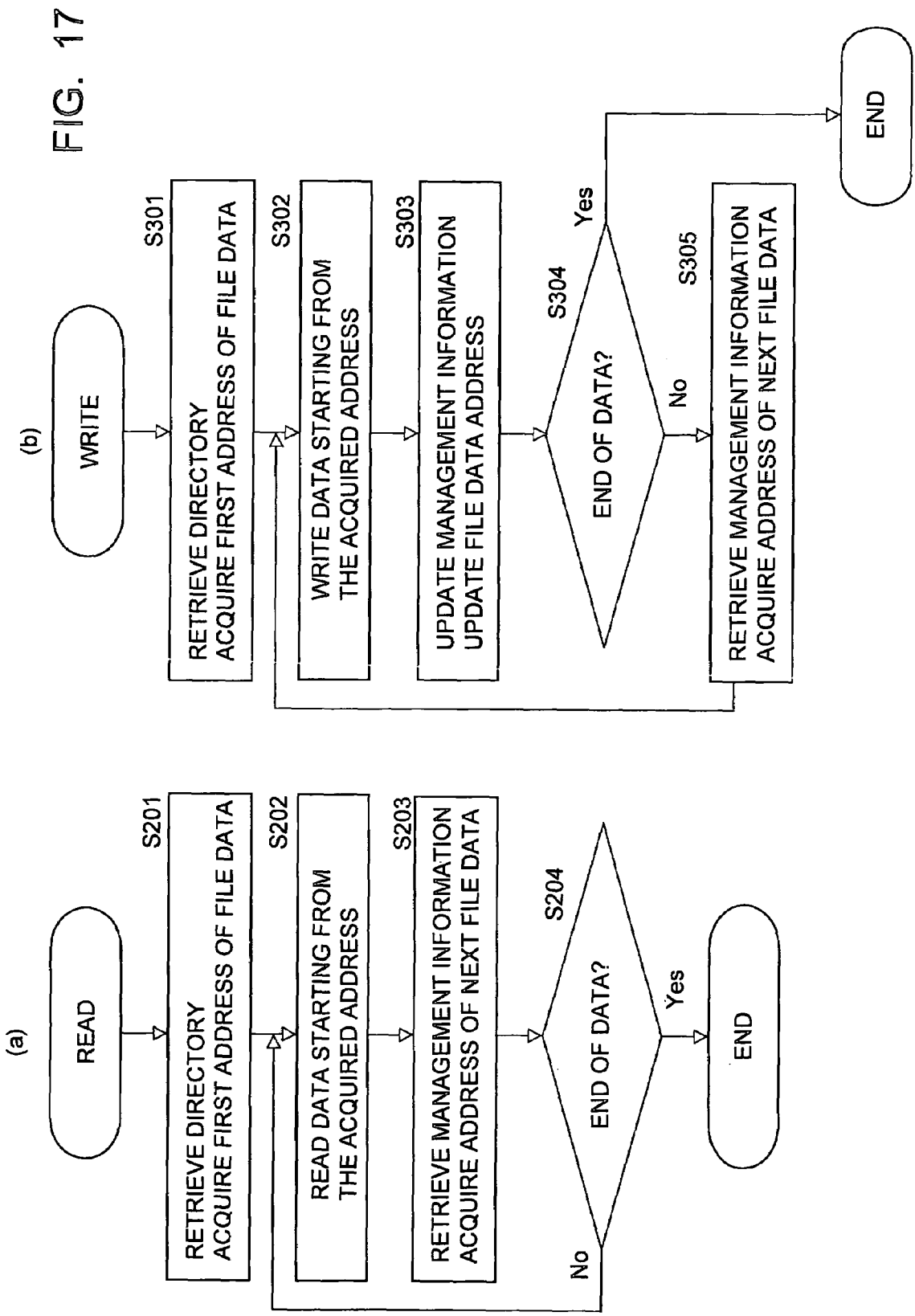
FIG. 17 is a flow chart showing a process of reading data from a flash memory and a process of writing data into the flash memory, according to the present invention.

The process of reading/writing data is described below with reference to FIG. 17. First, the data reading process is described with reference to FIG. 17(a). First, in step S201, a directory of a data file to be read is retrieved. As described earlier with reference to FIG. 13, the directory includes an identifier such as a file name identifying the data file and a cluster identifier indicating a starting logical address.

In the next step S202, a cluster address indicating a starting cluster of the data file is acquired from the directory, and a logical address corresponding to the cluster address is converted to a physical address in accordance with the logical-physical address conversion table. Furthermore, data stored at a location of the flash memory indicated by the physical address is read. Note that the location at which the logical-physical address conversion table is stored can be determined on the basis of the physical address, acquired from the management table, of the logical-physical address conversion table.

In step S203, a cluster identifier indicating a next logical address of a following part of the file data is acquired from the cluster-to-cluster concatenation information described in the FAT. The location at which the FAT is stored is indicated by the physical address of the FAT described in the management table. The logical address indicated by the cluster-to-cluster concatenation information descried in the FAT is then converted into a physical address in accordance with the logical-physical address conversion table, and data is read from the data storage location of the flash memory indicated by the physical address.

Steps S202 and S203 are performed repeatedly until it is determined in step S204 that the end of the data file is reached. Thus, reading of the data file stored in the plurality of clusters (blocks) is completed.

Now, the process of writing data into the flash memory is described below with reference to a flow chart shown in FIG. 17(b). First, in step S301, the FAT and the directory are examined to determine a logical address at which to write the data.

Figure 18:
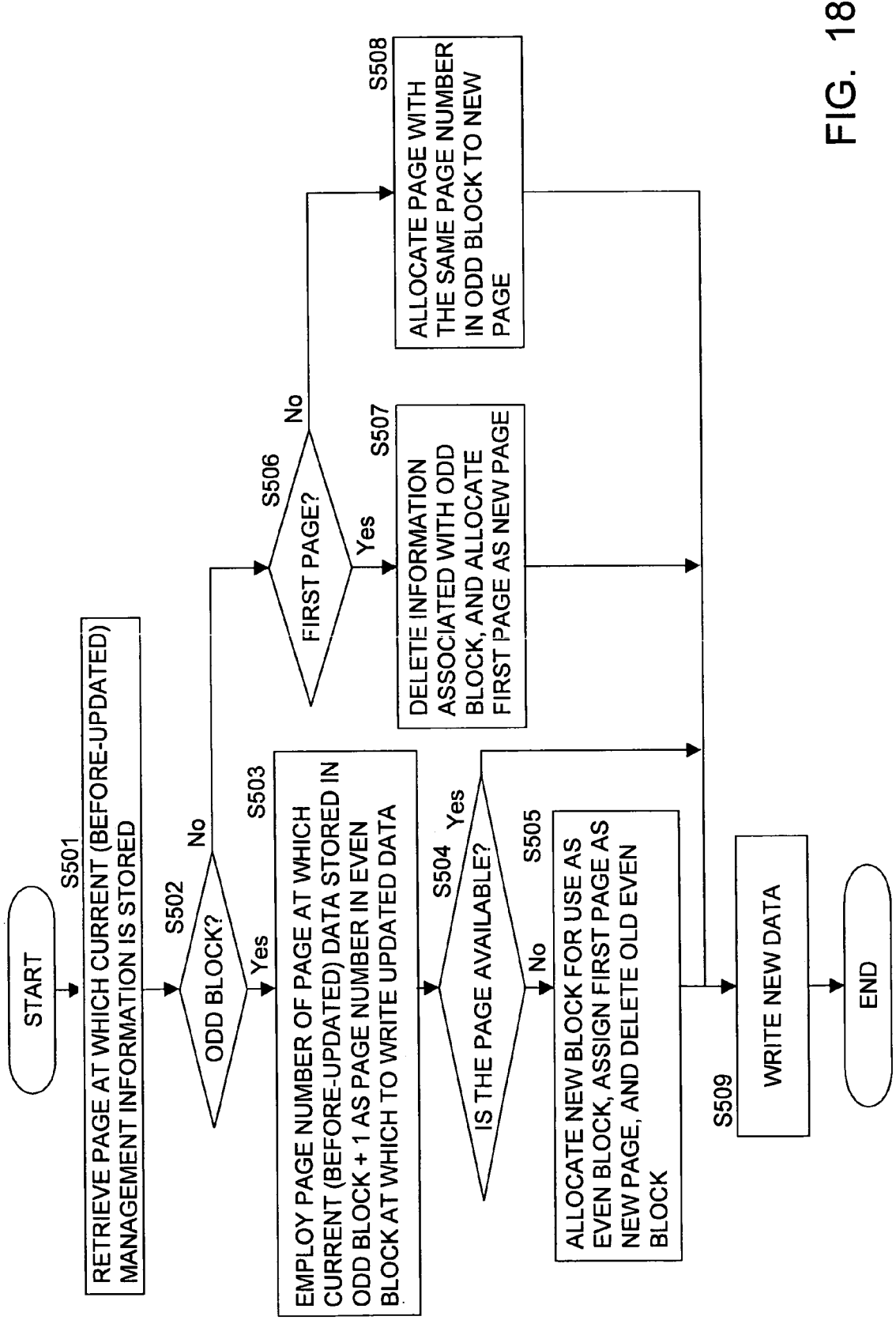
FIG. 18 a flow chart showing a process of updating management information, such as a logical-physical address conversion table or a FAT, of a flash memory according to the present invention.

In step S302, data is written into pages, sequentially, of the block. In step S303, the correspondence between the physical address and the logical address for the block in which the data has been written is set. That is, the logical-physical address conversion table is updated. The updating of the logical-physical address conversion table is performed by alternately using a page of one block of a block pair and a page of the other block of the block pair as described earlier with reference to FIG. 15. The details of the updating process will be described later with reference to FIG. 18.

In step S304, it is determined whether the end of the data to be written is reached. If the end of the data is not yet reached, then process proceeds to step S305. In step S305, a next logical address is determined from the FAT. The process then returns to step S302. In step S302, a following part of the data is written into the page of the determined logical address. The data is written page by page in the above-described manner.

In step S303, the management information is updated, that is, the logical-physical address conversion and the FAT including the address concatenation information (cluster concatenation information) are updated. Steps S302 to S305 are performed repeatedly until it is determined in step S304 that all data has been written.

In step described above, the updating of the logical-physical address conversion table and the FAT including the cluster concatenation information corresponding to cluster concatenation information is performed by alternately using a page of one block of a block pair and a page of the other block of the block pair as described earlier with reference to FIG. 15. The details of the updating process are described with reference to a flow chart shown in FIG. 18. In this process shown in FIG. 18, as in the process described earlier with reference to FIG. 15, pairs of an even block and an odd block are used as block pairs that are alternately used each time updating of the logical-physical address conversion table or the file management information such as the FAT is performed.

At the beginning of the process of updating the management information, in step S501, the controller detects a page of the flash memory in which the current management information is stored. The detection of the page is performed on the basis of the information described in the management table as described earlier. Note that the process associated with the management information described herein can be applied both to the logical-physical address conversion table and the FAT used as the file management information.

In step S502, it is determined whether the page in which the current data is stored is an odd block of a block pair. If the page in which the current data is stored is an odd block, the process proceeds to step S503, but otherwise the process proceeds to step S506. As described earlier with reference to FIG. 15, the new updated management information is written into a page having a serial number next to the serial number of the page in which the current management information is stored, that is, the new updated management information is written in a page of a block different from the block including the page in which the current management information is stored.

In the case in which the current management information is stored in a page of an odd block, the new updated management information is written into a page or an even block. In this case, in step S503, the controller determines a page in the even block having a page number equal to the page number in the odd block in which the current management information is stored plus one, and the controller employs the determined page as a page for use to write the new updated management information.

In step S504, it is determined whether the even block has a free page having a page number equal to that determined in step S503. If the even block has such a page, the process proceeds to step S509. However, if the even block does not have such a page, the process proceeds to step S505.

The process in step S504 described above is performed to determine whether the page in which the current management information is stored is the last page of the odd block. When the page in which the current management information is stored is the last page of the odd block, it is determined in step S504 that the page having the page number determined by the above-described incremental calculation does not exist in the even block.

In the case in which it is determined in step S504 that the block does not have an available page for use to write the updated management information, the process proceeds to step S505 in which a new block is acquired as an even block from alternate blocks and all old management information stored in the old even block is deleted. Furthermore, the first page of the acquired new even block, that is, a page having a page number 0 (serial number 0) is allocated ad a page for use to store the updated management information, and the updated management data such as updated logical-physical address conversion table data or updated FAT data serving as file management information is written in that page.

On the other hand, if it is determined in step S504 that the even blocks has an available page having a page number equal to the page number calculated in step S503, then, in step S509, the updated management information, i.e., the updated logical-physical address conversion table or the updated FAT used as the file management information, is written into the available page.

In the case in which it is determined in step S502 that the page in which the current management information is stored is not in an odd block, the process proceeds to step S506. In step S506, it is determined whether the page in which the current management information is stored is the first page of an even block, that is, the page has a page number 0 (serial number 0).

If it is determined that the page in which the current management information is stored is the first page having page number 0 (serial number 0) the process proceeds to step S507. In step S507, all information stored in the odd block is deleted, and the first page having page number 0 (serial number 1) in the odd block is allocated as an area for use to store the updated management information.

On the other hand, if it is determined in step S506 that the page in the even block in which the current management information is stored is a page other than the first page of the even block, the process proceeds to step S508. In step S508, a page having a page number equal to the page number in the even block in which the current management information is stored is allocated in the odd block for use to store the updated management information.

In step S509, the controller writes the updated management data, i.e., the updated logical-physical address conversion table data or the updated FAT data serving as file management information into the allocated page in the odd block.

In the present invention, as described above, two blocks are assigned as a block pair for use to store management information such as a logical-physical address conversion table or a FAT used as file management information, and writing of updated management information is performed by alternately using the two blocks. Therefore, even if an error occurs in the process of writing updated management information as can occur when the memory card is removed from the host device in the middle of updating of management information or when the power is turned off in the middle of updating of management information, the immediately previous management information remains without being lost. Thus, it is possible to perform a following process using the existing management information.

That is, it is possible to access data by using the existing management information and it is also possible to again perform updating of management information by using the existing management information. Thus, the management information can be stored in a highly reliable fashion without being affected by an occurrence of an error.

In an embodiment, updating of a logical-physical address conversion table or a FAT used as file management information is performed each time user data is written in the data area of the flash memory. In an alternative embodiment, updating is performed once every several executions of writing of user data.

Figure 19:
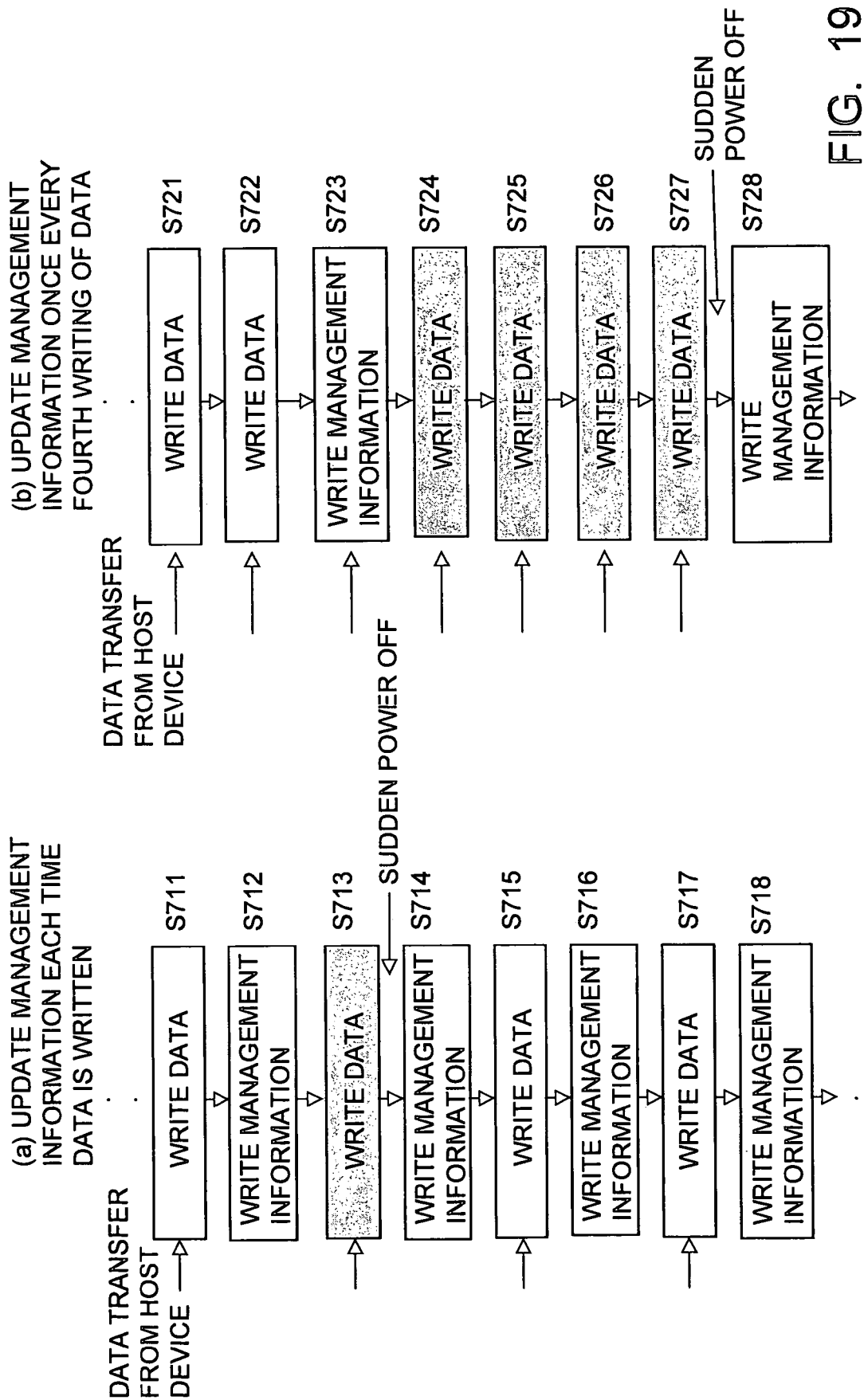
FIG. 19 a flow chart showing timings of updating management information, such as a logical-physical address conversion table or a FAT, of a flash memory according to the present invention.

FIG. 19(*a*) shows a flow chart of a process in which management information is written in the management information area of the flash memory each time data is written in the data area of the flash memory, and FIG. 19(*b*) shows a flow chart of a process in which management information is written in the management information area of the flash memory once every several executions of writing data in the data area of the flash memory.

In the case of the process shown in FIG. 19(*a*), if data is written in step S711, then in step S712 management information, that is, a logical-physical address conversion table or a FAT serving as file management information, is updated and updated data is written. Thereafter, if data is further written in step S713, then in step S714 management information is updated and written. Thereafter, management information is updated and written each time data is written. However, after data is written in step S713, if electric power to the memory card is turned off, for example, by removing the memory card from the host device before updated management information associated with the written data is completely written (in step S714), accessing to the data becomes impossible because address information associated with the data written in step S713 is not stored in the FAT and the logical-physical address conversion table in the management information area.

On the other hand, in the process shown in FIG. 19(*b*), management information is updated and written once every four executions of writing of data. That is, for example, in step S728, after data has been written four times via steps S724 to S727, management information, that is, a logical-physical address conversion table or a FAT serving as file management information, is updated and updated data is written. In this process, after data is written in step S727, if electric power to the memory card is turned off, for example, by removing the memory card from the host device before updated management information associated with the data written via steps S724 to S727 is completely written (in step S728), accessing to the data becomes impossible because address information associated with the data written via steps S724 to S727 is not stored in the FAT and the logical-physical address conversion table in the management information area.

As can be understood from the above discussion, it is desirable to employ the process shown in FIG. 19(*a*) in which management information is updated each time user data is written, because a less amount of data becomes inaccessible when an error associated with management information occurs.

Figure 20:
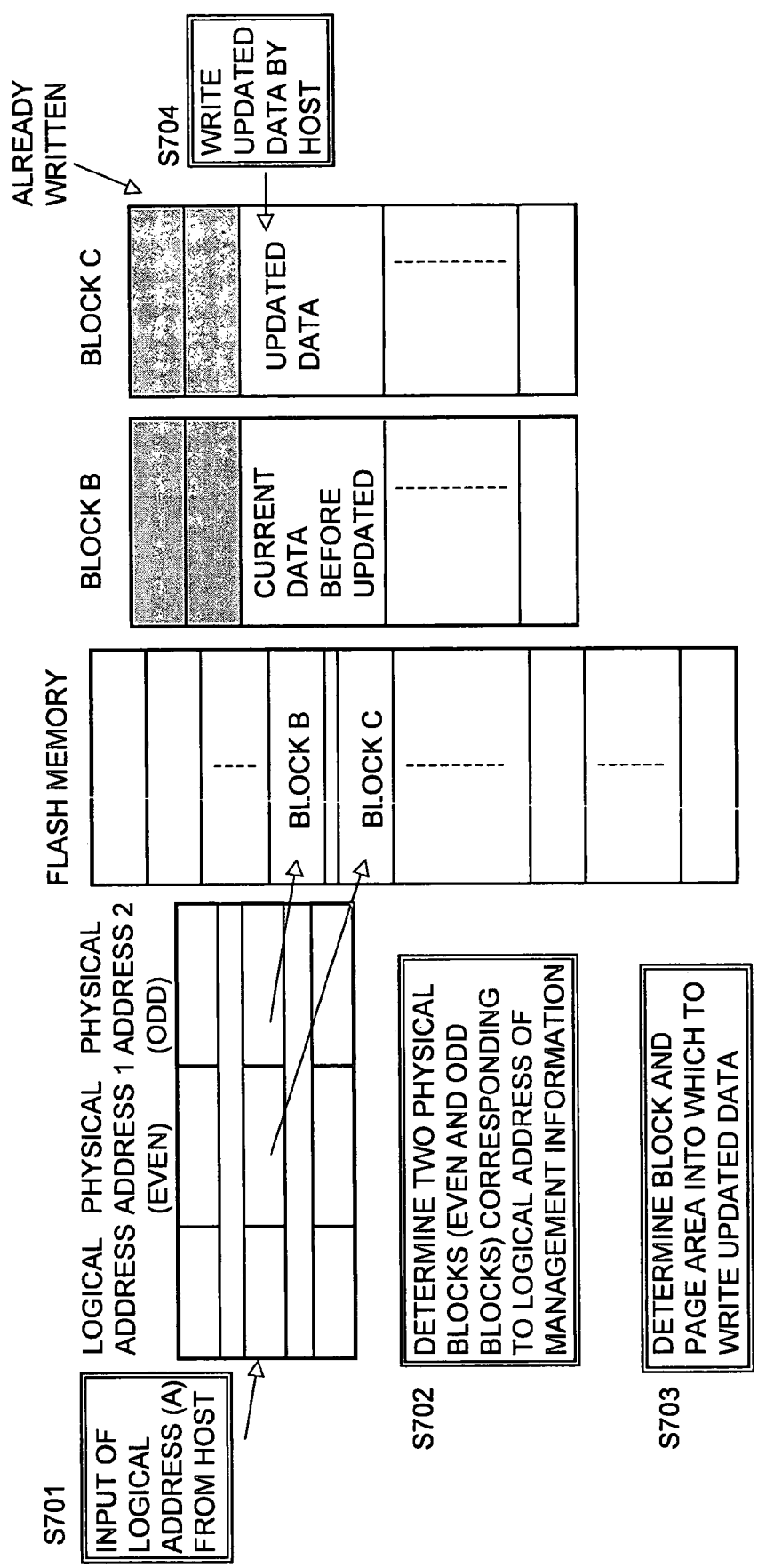
FIG. 20 a flow chart showing a process of updating management information, such as a logical-physical address conversion table or a FAT, of a flash memory according to the present invention.

Referring to FIG. 20, the process of writing updated management information such as a logical-physical address conversion table or a FAT used as file management information by alternately using a page in one of two blocks of a block pair and a page in the other block of the block pair is described below.

FIG. 20 shows the process of updating management information such as a logical-physical address conversion table or a FAT used as file management information, which is performed, for example, when the host device reads user data from the data area of the flash memory and rewrites updated data into the flash memory.

Referring to FIG. 20, the management information update process is described. First, in step S701, a logical address corresponding to management information to be updated is input. The logical address is determined on the basis of the management table (FIG. 16) descried above.

In step S702, a block into which to write updated management information is determined based on the management table. In the present invention, updating of management information stored in the management information area, that is, updating of a logical-physical address conversion table or a FAT serving as file management information is performed by alternately using pages in two blocks (an even block and an odd block) in the above-described manner. Therefore, two physical blocks are related to one logical address.

In step S703, a determination is made as to a block and a page in which to write updated management information, that is, an updated logical-physical address conversion table or an update FAT used as file management information. The determination is performed in a similar manner as descried above with reference to FIG. 18.

In step S704, after completion of determining the block and the page in which to write updated management information, the host device writes the updated management information, that is, the updated logical-physical address conversion table or the updated FAT used as file management information. Thus, the updating of the management information is completed.

In the example shown in FIG. 20, the previous management information is retained in block B, and updated management information is written in block C. In the present invention, as described above, because previous management information, that is, a previous logical-physical address conversion table and a previous FAT used as file management information are retained without being deleted, the previous management information is protected from being lost when an error occurs in the middle of the updating process. Furthermore, in the updating process, it is not necessary to acquire a block which has already been deleted and save a page of data, which should be maintained without being changed. Thus it is possible to reduce the time needed to perform the management information update process.

As described above, in the conventional technique, rewriting of data into the flash memory is performed, in general, by using blocks that have already been deleted. Therefore, in the conventional technique, it is necessary to allocate a block that has been deleted and save current data that should be retained without being deleted, each time updating of data is performed. In the present invention, in contrast, two blocks are assigned in advance as blocks for use to write management information, and updating of management information can be performed simply by writing only updated pages in units of pages by alternately using different blocks. This allows a great reduction in time needed to perform the updating process. Allocation of a block whose data has been deleted is performed only when all current allocated pages have been used, and thus the allocation process performed in such a situation does not have a significant influence on the total processing speed. Thus, even if a user removes the memory card from the host device immediately after updating user data, there is little possibility that an error due to incompletion of updating management information occurs, because updating of management information including the FAT and the logical-physical address conversion table is performed in a very short time.

Herein, let us represent parameters associated with the process as follows:
reading time of one page: Tr
writing time of one page: Tw
deleting time of one block: Te
number of pages per block: Pn Using the above parameters, the time needed to save existing data which needs to be retained into a block whose data has been deleted and further write a page of updated data in accordance with the conventional technique can be represented as follows:

$$Tr \times (Pn-1) + Tw \times Pn + Te$$

In the above equation, $Tr \times (Pn-1)$ indicates the time needed to read pages (as many as $Pn-1$) of data, which should be retained without being changed, from an old block, $Tw \times Pn$ indicates the time needed to write an updated page and the pages to be directly saved without being changed (the total number of pages is equal to Pn), and Te indicates the time needed to delete the block.

On the other hand, the time needed to write updated information using a block pair according to the present invention is equal to the time needed to write one page in the shortest case, that is, equal to Tw.

In the longest case that can occur when a block has no more available pages, the time needed to write updated information is equal to Tw+Te, which is very short.

As described above, the time needed to write updated information using a block pair according to the present invention is very short compared with the time needed in the conventional technique. Therefore, even if a user removes the memory card from the host device immediately after updating user data, there is little possibility that an error due to incompletion of updating management information occurs, because updating of management information is performed in a very short time.

[Configuration of Host Device]

An example of the configuration of the host device or information processing apparatus using the flash memory is described below with reference to FIG. 21. In this example shown in FIG. 21, a PC is used as the host device.

A CPU (Central Processing Unit) 701 performs various processes in accordance with a program stored in a ROM (Read Only Memory) 702 or an HDD 704. A RAM 703 stores a program executed by the CPU 701 and also stores data used in the execution of the program. The CPU 701, the ROM 702, the RAM 703, and the HDD 704 are connected with each other via a bus 705.

The bus 705 is connected to an input/output interface 706, which is connected to, for example, an input unit 707 including a keyboard, a switch, a button, and/or a mouse operated by a user, and an output unit 708 including an LCD or a CRT and a speaker for presenting information to the user. The input/output interface 706 is also connected with a communication unit 709 serving as data transmission/reception means, and a flash memory interface 710 to which a memory card 711 including the flash memory described above can be attached and which serves as an interface for reading/writing data from/to the memory card 711.

Figure 21:
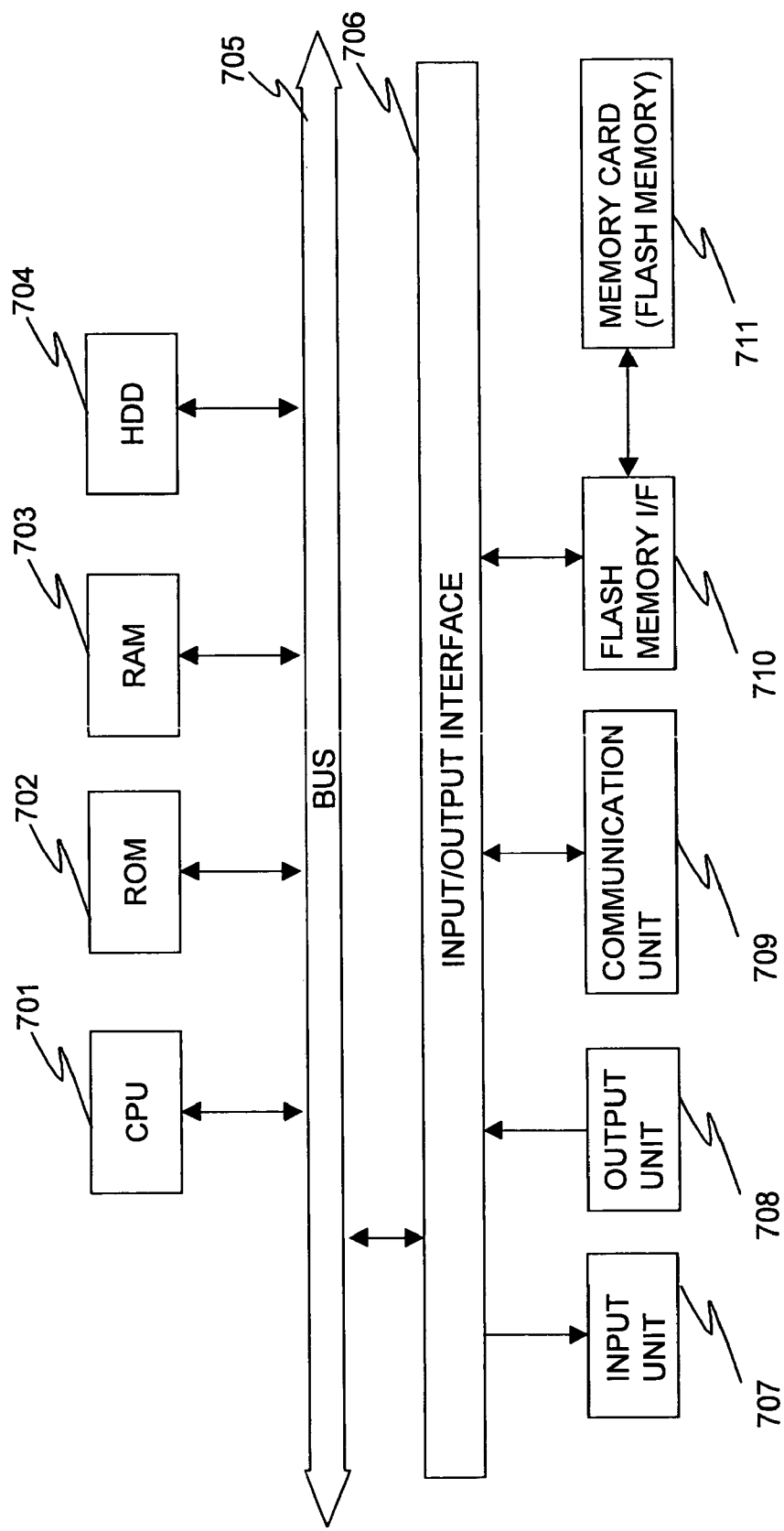
FIG. 21 is a block diagram showing a hardware configuration of a PC serving as an information processing apparatus which reads/writes data from/to a flash memory attached to the PC.

The host device or the information processing apparatus using the flash memory is not limited to a personal computer (PC) such as that shown in FIG. 21, but the flash memory according to the present invention may also be used in various types of electronic devices such as a video camera, a portable telephone, a PDA or a similar portable communication terminal, a playback device, and a display. Note that the hardware configuration may vary depending on the device and the device may perform particular processing depending on the hardware configuration.

The present invention has been described above with reference to specific embodiments by way of example and not limitation. It should be apparent to those skilled in the art that various modifications and substitutions are possible without departing from the spirit and the scope of the invention as defined by the appended claims.

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The program may be stored in advance in a storage medium such as a hard disk or a ROM (Read Only Memory). The program may also be temporarily or permanently stored in a removable storage medium such as a flexible disk, a CD-ROM (Compact Disc Read Only Memory), an MO (Magneto-optical) disk, a DVD (Digital Versatile Disc), a magnetic disk, or a semiconductor memory. The program stored on such a removable storage medium may be supplied in the form of so-called packaged software.

The program may be installed from such a removable storage medium into the computer. The program may be transmitted from a download site via a wireless transmission channel or via a wired transmission channel using a network such as a LAN (Local Area Network) or the Internet. On receiving the program transmitted from the download site, the computer may install the received program into a hard disk disposed in the computer.

The processes disclosed in the present description may be performed time-sequentially in the same order as that described in the program, or may be performed in parallel or individually depending on the processing power of the computer.

INDUSTRIAL APPLICABILITY

In the present invention, as described above, file management information such as a FAT serving as address management information in a flash memory is stored in a management information area of the memory, a pair of blocks is assigned as blocks for use to store data of the FAT, writing of updated FAT information is performed by alternately using the two blocks of the block pair such that previous FAT information is retained in one of the two blocks of the block pair, and updated FAT information is written in the other block of the block pair, whereby, even when an error occurs in the middle of the process of writing the updated management information, the previous FAT information is preserved without being lost, and thus processing using the previous FAT information is possible. For example, accessing of data using the previous FAT information is possible. Furthermore, re-updating of the FAT information is also possible using the previous FAT information.

Furthermore, in the present invention, two different physical addresses are related to one logical address corresponding to a FAT, two blocks to be used to write updated data are immediately determined based on a given logical address, and a block and a page to be used to write the updated data depending on a block and a page in which the previous data is stored. Thus, it is possible to quickly determine the block and the page to be used to write the updated management information.

Furthermore, in the process of updating file management information such as a FAT according to the present invention, unlike the conventional process of rewriting data, it is not necessary to acquire a block which has already been deleted and copy page data from a block, where previous data is stored, into the already-deleted block, and thus it is possible to reduce the time needed to perform the management information update process. Even if a user removes the memory card from the host device immediately after updating user data, there is little possibility that an error due to incompletion of updating management information occurs, because updating of management information including the FAT and the logical-physical address conversion table is performed in a very short time.

The invention claimed is:

1. A data storage device including a data storage unit and a control unit for controlling inputting and outputting of data to or from the data storage unit, wherein:
   the data storage unit is divided into blocks each including a plurality of pages each having a predetermined storage capacity, and the data storage unit includes a data area for storing user data and a management information area for storing management information including address information used to access the data area;
   in the management information area, file management information including address concatenation information associated with a data file stored in the data area is stored; and
   the control unit executes a process of writing updated file management information such that:
   previous file management information is retained in a page in one of two different blocks forming a block pair, and the updated file management information is written in a page in the other one of the two blocks of the block pair, wherein the block pair is assigned in advance at the same time interval and comprises an even block and an odd block, and
   wherein when previous file management information is written to the even block, updated file management information is written to the odd block, and
   wherein the even block and the odd block are then used alternately for storing updated file management information and previous file management information.

2. A data storage device according to claim 1, wherein the file management information is a FAT (File Allocation Table), and in the process of writing updated file management information, the control unit writes updated FAT information by alternately using a page in one of the two blocks of the block pair and a page in the other one of the two blocks of the block pair.

3. A data storage device according to claim 1, wherein two physical addresses of the block pair are set as address information corresponding to one logical address assigned to the file management information; and
   the control unit acquires address information of two physical addresses corresponding to a logical address indicating file management information to be updated, and respective two physical addresses as the block pair to be used to write updated file management information.

4. A data storage device according to claim 1, wherein the control unit executes the process of writing updated file management information each time a unit of user data is written in the data area assigned as the storage area for storing user data.

5. A data storage device according to claim 1, wherein in the management information area of the data storage unit, a logical-physical address conversion table is further stored, which indicates the correspondence between a logical address assigned to data stored in the data area and a physical address indicating a physical location at which the data is stored in the data area.

6. A data storage device according to claim 5, wherein the control unit further executes a process of writing updated information of the logical-physical address conversion table such that:
 previous information of the logical-physical address conversion table is retained in a page in one of two different blocks forming a block pair, and the updated information of the logical-physical address conversion table is written in a page in the other one of the two blocks of the block pair.

7. A data storage device according to claim 1, wherein:
 the data storage device is adapted to be capable of removably connected with an information processing apparatus, and the data storage device further comprises interface means for inputting or outputting data to or from the information processing apparatus; and
 when the control unit receives a logical address from the information processing apparatus via the interface means, the control unit acquires two physical addresses corresponding to the received logical address and identifies two blocks indicated by the respective two physical addresses as the block pair to be used to write updated file management information.

8. A data storage device according to claim 1, wherein the control unit executes:
 the process of updating file management information in units of pages; and
 the process of writing updated management information by alternately using a page in one of two blocks forming a block pair and a page in the other one of the two blocks forming the block pair, and
 wherein in the process of writing updated management information, if a block of the block pair does not have an available page, the control unit deletes data stored in a block other than a block in which previous file management information is stored, and writes the updated management information in the first page of the deleted block.

9. A method of updating management information in a data storage device including a data storage unit and a control unit for controlling inputting and outputting of data to or from the data storage unit, the method comprising the steps of:
 inputting a logical address corresponding to management information to be updated;
 identifying a block pair by acquiring address information of two physical addresses corresponding to the logical address and identifying two blocks indicated by the respective two physical addresses as the block pair to be used to write updated file management information;
 writing the updated management information such that previous file management information is retained in a page in one of two blocks of the block pair, and the updated file management information is written in a page in the other one of the two blocks of the block pair; and
 assigning the block pair in advance at the same time interval and such that the block pair comprises an even block and an odd block, and
 wherein when previous file management information is written to the even block, updated file management information is written to the odd block, and
 wherein the even block and the odd block are then used alternately for storing updated file management information and previous file management information.

10. A method of updating management information in a data storage device, according to claim 9, wherein:
 the file management information is a FAT (File Allocation Table); and
 in the process of writing updated management information, updated FAT information is written by alternately using a page of one of two blocks of the block pair and a page of the other block of the block pair.

11. A method of updating management information in a data storage device, according to claim 9, wherein the step of writing updated file management information is executed each time a unit of user data is written in a data area assigned as an area for storing user data.

12. A method of updating management information in a data storage device, according to claim 9, further comprising the steps of:
 identifying a block pair by acquiring address information of two physical addresses corresponding to the logical address input in the logical address inputting step, and identifying two blocks indicated by the respective two physical addresses as the block pair to be used to write updated information of a logical-physical address conversion table; and
 writing the updated management information such that previous information of the logical-physical address conversion table is retained in a page in one of two blocks of the block pair, and the updated information of the logical-physical address conversion table is written in a page in the other one of the two blocks of the block pair.

13. A method of updating management information in a data storage device, according to claim 9, wherein the step of writing updated management information includes the steps of:
 updating file management information in units of pages; and
 writing updated management information by alternately using a page in one of two blocks forming a block pair and a page in the other one of the two blocks forming the block pair, and
 wherein in the step of writing updated management information, if a block of the block pair does not have an available page, data stored in a block is deleted other than a block in which previous file management information is stored, and the updated management information is written in the first page of the deleted block.

14. A computer-readable medium storing a computer program for executing a process of updating management information in a data storage device including a data storage unit and a control unit for controlling inputting and outputting of data to or from the data storage unit, the process comprising the steps of:
 inputting a logical address corresponding to management information to be updated;
 identifying a block pair by acquiring address information of two physical addresses corresponding to the logical address and identifying two blocks indicated by the respective two physical addresses as the block pair to be used to write updated file management information;
 writing the updated management information such that previous file management information is retained in a page in one of two blocks of the block pair, and the updated file management information is written in a page in the other one of the two blocks of the block pair; and
 assigning the block pair in advance at the same time interval and such that the block pair comprises an even block and an odd block, and
 wherein when previous file management information is written to the even block, updated file management information is written to the odd block, and
 wherein the even block and the odd block are then used alternately for storing updated file management information and previous file management information.

* * * * *